(12) United States Patent
Yamana et al.

(10) Patent No.: US 11,221,926 B2
(45) Date of Patent: Jan. 11, 2022

(54) INFORMATION PROCESSING SYSTEM AND INFORMATION PROCESSING APPARATUS

(71) Applicant: FUJITSU LIMITED, Kawasaki (JP)

(72) Inventors: Tatsuya Yamana, Kawasaki (JP); Reo Tajima, Nerima (JP)

(73) Assignee: FUJITSU LIMITED, Kawasaki (JP)

(*) Notice: Subject to any disclaimer, the term of this patent is extended or adjusted under 35 U.S.C. 154(b) by 80 days.

(21) Appl. No.: 16/680,556

(22) Filed: Nov. 12, 2019

(65) Prior Publication Data

US 2020/0167249 A1    May 28, 2020

(30) Foreign Application Priority Data

Nov. 22, 2018    (JP) .............................. JP2018-218913

(51) Int. Cl.
*G06F 11/20*    (2006.01)
*G06F 13/40*    (2006.01)

(52) U.S. Cl.
CPC ...... *G06F 11/2033* (2013.01); *G06F 11/2028* (2013.01); *G06F 11/2035* (2013.01); *G06F 11/2046* (2013.01); *G06F 11/2048* (2013.01); *G06F 13/4022* (2013.01); *G06F 2201/805* (2013.01)

(58) Field of Classification Search
CPC .............. G06F 11/202; G06F 11/2023; G06F 11/2028; G06F 11/2046; G06F 11/2033; G06F 13/4022; G06F 2201/805; G06F 11/2035

See application file for complete search history.

(56) References Cited

U.S. PATENT DOCUMENTS

2003/0188222 A1* 10/2003 Abbondanzio ..... G06F 11/2028
                                                                     714/12
2005/0102557 A1*  5/2005 Davies ................ G06F 11/2092
                                                                     714/11

(Continued)

FOREIGN PATENT DOCUMENTS

JP    2002-271348 A    9/2002
JP    2002-288000 A   10/2002

(Continued)

*Primary Examiner* — Bryce P Bonzo
*Assistant Examiner* — Albert Li
(74) *Attorney, Agent, or Firm* — Fujitsu Patent Center

(57) ABSTRACT

An information processing system includes a plurality of information processing apparatuses each of which includes hardware, a control processor, and a switch circuit wherein when a failure of a first control processor in a first information processing apparatus of the plurality of information processing apparatuses is detected, a first switch circuit in the first information processing apparatus is configured to generate a connection of first hardware in the first information processing apparatus to a signal line between the first information processing apparatus and a second information processing apparatus of the plurality of information processing apparatuses, a second switch circuit in the second information processing apparatus is configured to generate a connection of a second control processor in the second information processing apparatus to the signal line, and the second control processor is configured to acquire information transmitted from the first hardware via the signal line.

13 Claims, 29 Drawing Sheets

(56) References Cited

U.S. PATENT DOCUMENTS

| | | | |
|---|---|---|---|
| 2009/0259884 A1* | 10/2009 | Duron ................ | G06F 11/2028 714/11 |
| 2010/0138686 A1* | 6/2010 | Arata ................ | G06F 11/2038 714/4.1 |
| 2014/0317441 A1* | 10/2014 | Arata ................ | G06F 11/2025 714/4.12 |
| 2016/0099886 A1* | 4/2016 | Rao ...................... | H04L 47/826 709/226 |
| 2018/0039552 A1* | 2/2018 | Moskowiz .......... | G06F 11/0757 |

FOREIGN PATENT DOCUMENTS

| | | |
|---|---|---|
| JP | 2006-92061 A | 4/2006 |
| JP | 2009-123238 A | 6/2009 |

\* cited by examiner

FIG. 9A

| OUTPUT-SIDE CONTROL SIGNAL | | COUPLING DESTINATION PORT |
|---|---|---|
| G1 | G2 | |
| 0 | 0 | A |
| 0 | 1 | B |
| 1 | 0 | C |
| 1 | 1 | D |

FIG. 9B

| INPUT-SIDE CONTROL SIGNAL | | COUPLING DESTINATION PORT |
|---|---|---|
| G3 | G4 | |
| 0 | 0 | a |
| 0 | 1 | b |
| 1 | 0 | c |
| 1 | 1 | d |

INFORMATION PROCESSING SYSTEM AND INFORMATION PROCESSING APPARATUS

CROSS-REFERENCE TO RELATED APPLICATION

This application is based upon and claims the benefit of priority of the prior Japanese Patent Application No. 2018-218913, filed on Nov. 22, 2018, the entire contents of which are incorporated herein by reference.

FIELD

The embodiments discussed herein are related to an information processing technology.

BACKGROUND

The intelligent platform management interface (IPMI) has been known as the standard specification for management and monitoring of an information processing system. The IPMI manages and monitors the hardware of an information processing system using a management board (MMB) and a baseboard management controller (BMC).

In a computer system with duplicated system control devices, when a failure occurs in one system control device and device switching is performed, a control method is known to take over control information before switching to the switched control device. Japanese Laid-open Patent Publication No. 2002-288000 is an example of related art.

SUMMARY

According to an aspect of the embodiments, an information processing system includes a plurality of information processing apparatuses each of which includes hardware, a control processor, and a switch circuit wherein when a failure of a first control processor in a first information processing apparatus of the plurality of information processing apparatuses is detected, a first switch circuit in the first information processing apparatus is configured to generate a connection of first hardware in the first information processing apparatus to a signal line between the first information processing apparatus and a second information processing apparatus of the plurality of information processing apparatuses, a second switch circuit in the second information processing apparatus is configured to generate a connection of a second control processor in the second information processing apparatus to the signal line, and the second control processor is configured to acquire information transmitted from the first hardware via the signal line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 9A and 9B are diagrams illustrating control signals;

DESCRIPTION OF EMBODIMENTS

In an information processing system including a plurality of system boards (SBs), a BMC on each SB may acquire information from hardware on the same SB. However, in a case where a BMC on any SB fails, information may not be acquired from the hardware on the SB. This may occur not only in managing hardware in an information processing system including a plurality of SBs but also in managing hardware in another information processing system including a plurality of information processing apparatuses.

Figure 1:
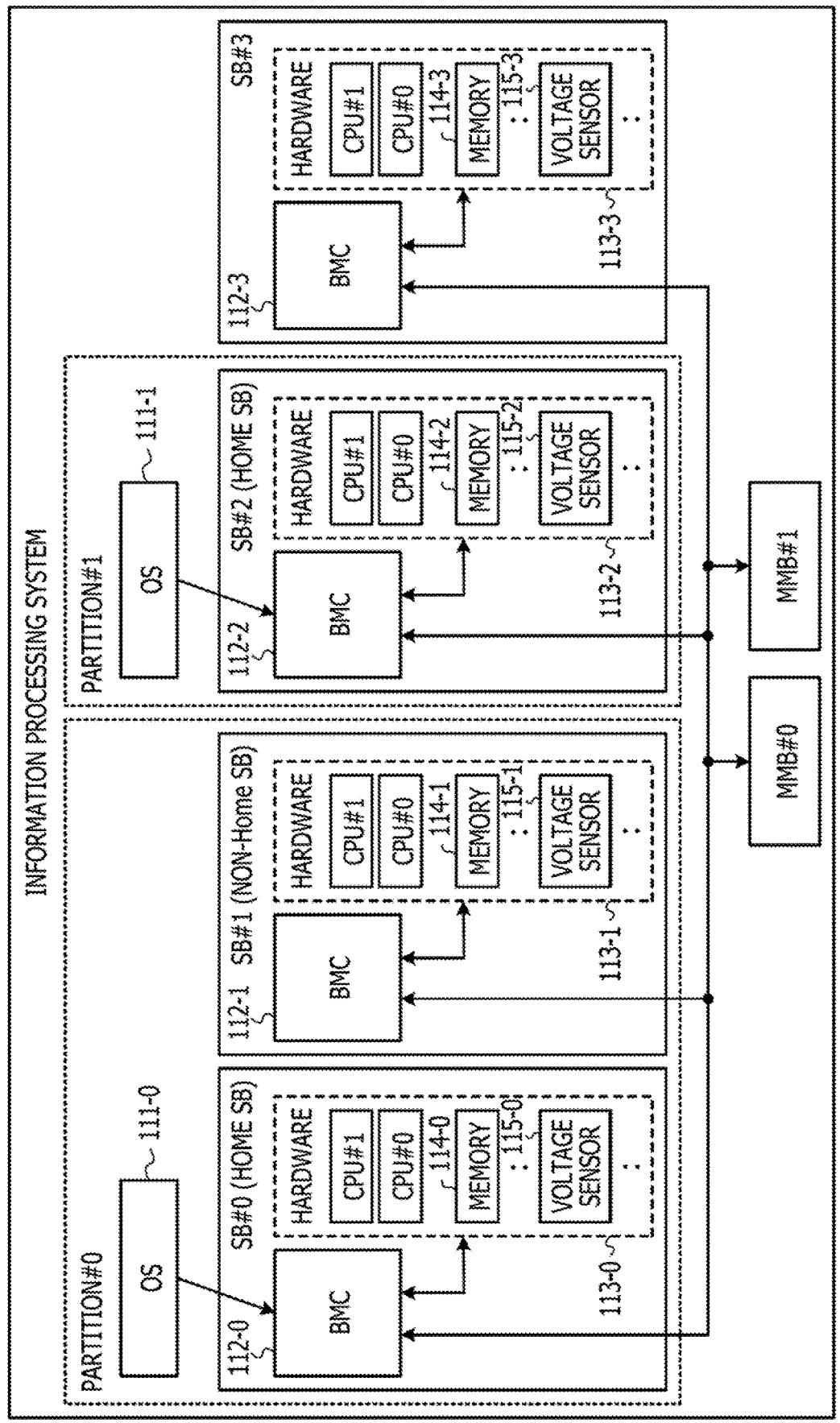
FIG. 1 is a configuration diagram of an information processing system including a plurality of SBs.

Hereinafter, an embodiment will be described in detail with reference to the drawings. FIG. 1 illustrates a configuration example of an information processing system including a plurality of SBs. The information processing system 101 in FIG. 1 includes SB #0 to SB #3, MMB #0, and MMB #1.

The MMB #0 and the MMB #1 are redundant MMBs and manage and monitor the entire information processing system 101 using firmware. A partition may be constructed by users selecting one or more SBs and one or more input/output (IO) resources through a user interface that the MMB provides. An operating system (OS) and a basic input/output system (BIOS) operate in units of partitions, and MMB #0 and MMB #1 hold partition information.

One or a plurality of partitions may be constructed in the information processing system 101. In the case where one partition includes a plurality of SBs, the user sets any one of the SBs as a home SB.

In FIG. 1, partition #0 includes SB #0 and SB #1, and partition #1 includes only SB #2. SB #0 is the Home SB of partition #0, and SB #1 is a non-Home SB. SB #2 is the Home SB of partition #1. Home BMC is a BMC that may access the hardware on all SBs in the partition, communicates with the OS, and directly provides each function of BMC to the outside through web user interface (WebUI).

The SB #i (i=0 to 3) includes the BMC 112-$i$ and the hardware 113-$i$. Hardware 113-$i$ includes hardware devices, such as a central processing unit (CPU) #0, a CPU #1, a memory 114-$i$, and a voltage sensor 115-$i$. The BMC 112-$i$ is coupled to the hardware 113-$i$ by a signal line of an inter-integrated circuit (I2C) or the like and manages and monitors the hardware 113-$i$ in conformance with the IPMI.

The BMC of the Home SB holds sensor definition information and information output by the hardware device on the SB, and the BMC of the non-Home SB holds only information output by the hardware device on the SB. The information output by the hardware device may be referred to as sensor data.

The OS 111-$j$ (j=0, 1) operates on the CPU of the Home SB in the partition #j, and may access the BMC on the Home SB, through a keyboard controller style (KCS) interface.

The BMCs 112-0 to 112-3 and the MMBs #0 and #1 are coupled through a private local area network (LAN) closed in the information processing system 101. MMB #j (j=0, 1) may communicate with BMC 112-0 to BMC 112-3 through a private LAN, and BMC 112-$i$ may communicate with other BMC 112-$k$ (k≠i) through a private LAN.

Based on the sensor definition information, the Home SB BMC acquires sensor data output by the hardware on the SB from the non-Home SB BMC. The OS collects sensor data from the BMC on the non-Home SB through the BMC on the Home SB in the partition. In order to shorten the time for collecting the sensor data output by the hardware on the non-Home SB, a method using the technique of the comparative example may be considered.

Figure 2:
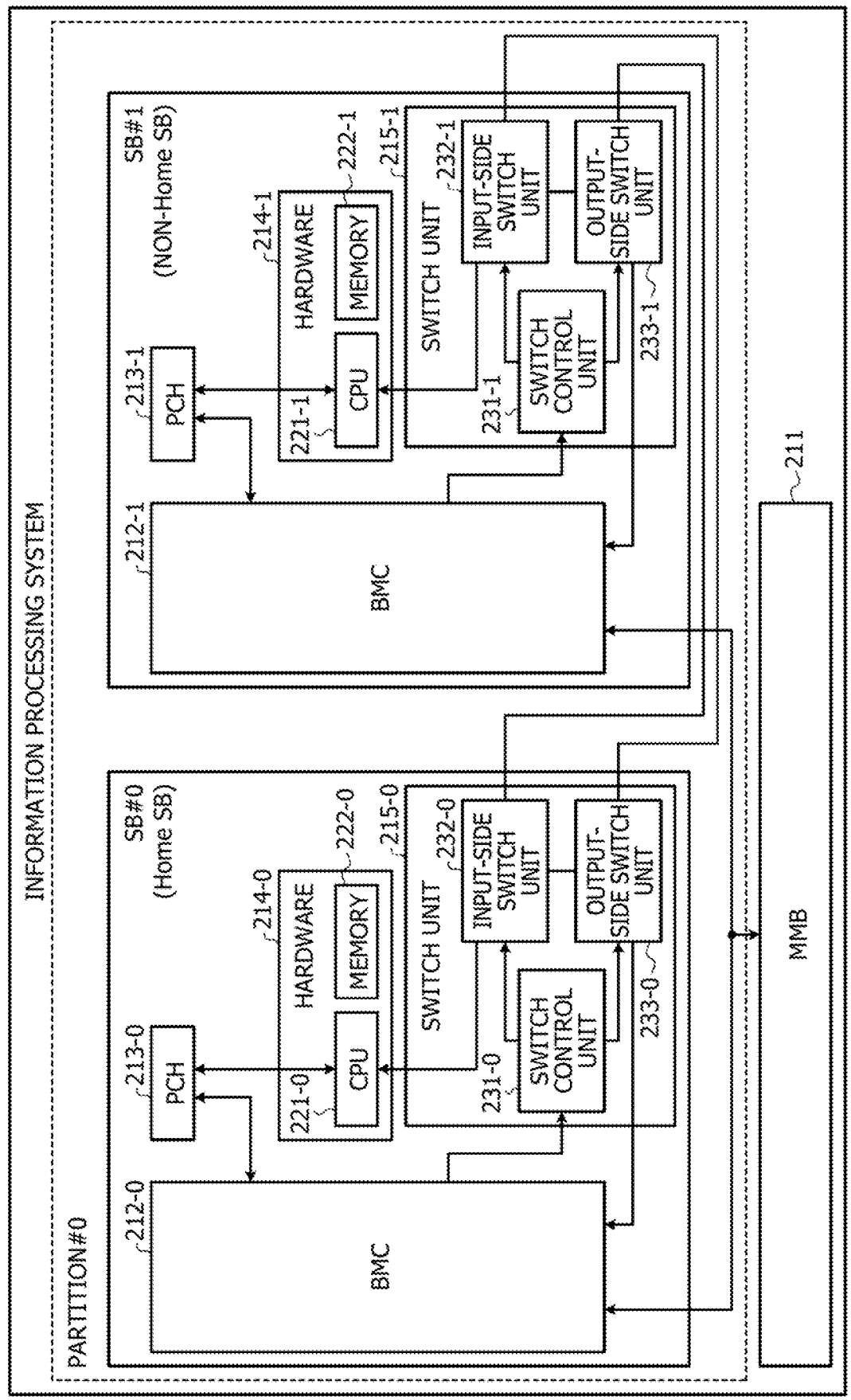
FIG. 2 is a configuration diagram of an information processing system of a comparative example.

FIG. 2 illustrates a configuration example of an information processing system using the technique of the comparative example. The information processing system 201 in FIG. 2 includes partition #0 and MMB 211, and the partition #0 includes SB #0 and SB #1. SB #0 is the Home SB of partition #0, and SB #1 is a non-Home SB.

The SB #i (i=0, 1) includes a BMC 212-$i$, a platform controller hub (PCH) 213-$i$, hardware 214-$i$, and a switch unit 215-$i$. The hardware 214-$i$ includes a CPU 221-$i$ and a memory 222-$i$. The BMC 212-$i$ manages and monitors the hardware 214-$i$.

The PCH 213-$i$ is a large-scale integrated circuit (LSI) that manages communication between the CPU 221-$i$ and peripheral IO devices. As a bus coupled to the peripheral IO device, a serial AT attachment (SATA), a Universal Serial Bus (USB), a low pin count (LPC) bus, or the like is used.

The PCH 213-$i$ and the CPU 221-$i$ are coupled by a signal line such as a direct media interface (DMI) bus, and the PCH 213-$i$ and the BMC 212-$i$ are coupled by a signal line such as an LPC bus. Due to restrictions on the CPU architecture, after the OS is started on the CPU 221-0, the OS may recognize only the PCH 213-0 on the Home SB.

The PCH 213-$i$ outputs a signal received from the BMC 212-$i$ or another IO device to the CPU 221-$i$, and outputs a signal received from the CPU 221-$i$ to the BMC 212-$i$ or another IO device.

The switch unit 215-$i$ includes a switch control unit 231-$i$, an input-side switch unit 232-$i$, and an output-side switch unit 233-$i$. The input-side switch unit 232-$i$ is coupled to the hardware 214-$i$ and the output-side switch units 233-0 and 233-1 by signal lines of I2C or the like. The output-side switch unit 233-$i$ is coupled to the BMC 212-$i$ and the input-side switch units 232-0 and 232-1 through signal lines of I2C or the like. The switch control unit 231-$i$ changes the coupling of the signal lines by switching the input-side switch unit 232-$i$ and the output-side switch unit 233-$i$.

The BMC 212-$i$ is coupled to the switch control unit 231-$i$ by a signal line of a general purpose input/output (GPIO) or the like. The BMC 212-$i$ may also access any hardware 214-$i$ on SB #0 or SB #1 by switching the input-side switch unit 232-$i$ and the output-side switch unit 233-$i$ through the switch control unit 231-$i$.

When constructing partition #0, MMB 211 notifies BMC 212-0 on SB #0 which is the home SB of "SB #0" and "SB #1" as identification information of SBs belonging to partition #0. The MMB 211 notifies the BMC 212-0 that SB #0 is the Home SB of the partition #0.

The BMC 212-0 outputs a control signal to the switch control unit 231-0, and the switch control unit 231-0 controls the input-side switch unit 232-0. Consequently, the hardware 214-0 is coupled to the output-side switch unit 233-0 through the input-side switch unit 232-0.

Next, the MMB 211 notifies the BMC 212-1 on the SB #1 which is a non-Home SB of the home SB identification information "SB #0".

The BMC 212-1 outputs a control signal to the switch control unit 231-1, and the switch control unit 231-1 controls the input-side switch unit 232-1. Consequently, the hardware 214-1 is coupled to the output-side switch unit 233-0 through the input-side switch unit 232-1.

When collecting sensor data, the OS operating on the CPU 221-0 of SB #0 issues an acquisition request for acquiring sensor data of hardware of partition #0 to the BMC 212-0.

The BMC 212-0 outputs a control signal to the switch control unit 231-0, and the switch control unit 231-0 controls the output-side switch unit 233-0. Consequently, the BMC 212-0 is coupled to the hardware 214-0 through the output-side switch unit 233-0. The BMC 212-0 accesses the hardware 214-0 to obtain sensor data from the hardware 214-0.

Next, the BMC 212-0 outputs a control signal to the switch control unit 231-0, and the switch control unit 231-0 controls the output-side switch unit 233-0. Consequently, the BMC 212-0 is coupled to the hardware 214-1 through the output-side switch unit 233-0 and the input-side switch unit 232-1. The BMC 212-0 accesses the hardware 214-1 to obtain sensor data from the hardware 214-1.

The BMC 212-0 returns the sensor data obtained from the hardware 214-0 and the hardware 214-1 to the OS.

According to the information processing system 201 in FIG. 2, the BMC on the Home SB may directly acquire sensor data not only from the hardware on the Home SB but also from the hardware on the non-Home SB. This allows sensor data on all hardware in the partition to be returned, in response to an acquisition request from the OS or agent software operating on the OS, without passing through the BMC on the non-home SB. This reduces the time taken to collect sensor data in the partition.

When a BMC on a non-Home SB fails during system operation in a partition including a plurality of SBs, the MMB may not acquire sensor data from the non-Home SB. However, the MMB may indirectly acquire the sensor data of the SB, by inquiring the BMC on the Home SB about the sensor data of the SB mounted with the failed BMC.

On the other hand, in a case where the BMC on Home SB fails during system operation, the MMB is not be able to operate on the partition, but the OS continues to operate. In this case, the user may abandon the management and monitoring of the hardware, and continue the system operation. If the user abandons the management and monitoring of the hardware, sensor data of the hardware is no longer collected, so the system will continue to operate under the potential error condition.

Therefore, it is considered to restore the function of the BMC on the Home SB, by temporarily stopping system operation and replacing the board on which a BMC, a PCH, and the like are mounted or the Home SB itself on the Home SB. However, it is desirable to avoid the suspension of system operation as much as possible.

If the role of the BMC on the Home SB may be taken over to the BMC on another SB in the partition, the hardware management and monitoring may be continued without stopping system operation. Hereinafter, taking over the role of the BMC on the Home SB to another BMC may be described as switching the Home BMC.

Normally, the Home BMC and the BMC on the Home SB match, but when the Home BMC is switched, the Home SB is not changed and the BMC on another SB becomes a new Home BMC. Therefore, the Home BMC and the BMC on Home SB do not match.

In the information processing system 201 in FIG. 2, switching of Home BMC may be realized by switching of the input-side switch unit 232-$i$ and the output-side switch unit 233-$i$ on each SB. However, only the BMC 212-$i$ on the same SB may control the input-side switch unit 232-$i$ and the output-side switch unit 233-$i$.

Even when the BMC 212-0 on the Home SB fails, the BMC 212-1 on the non-Home SB may switch the input side switch unit 232-1 and the output side switch unit 233-1. However, since the failed BMC 212-0 may not switch the input-side switch unit 232-0 and the output-side switch unit 233-0, it is difficult to correctly couple the hardware 214-0 to the BMC 212-1.

The sensor data of each hardware 214-$i$ is managed by the Home BMC, and is stored in the MMB 211 at a frequency of once every predetermined time (for example, 10 seconds). However, when the BMC 212-0 fails, the sensor data acquired from the last storage of the sensor data in the MMB 211 to immediately before the occurrence of the failure may not be taken over to another BMC.

The Home BMC often communicates with the OS operating on the CPU 221-0 through the PCH 213-0 during system operation. For example, when performing virtual media, server management KCS command communication, power control, hardware error monitoring, or the like, communication occurs between the Home BMC and the OS. The BMC 212-$i$ on each SB is physically coupled only to the PCH 213-$i$ on the same SB, and is not physically coupled to the PCH 213-$i$ on the other SB.

Thus, even if the Home BMC may be switched, a new Home BMC existing over the SB other than Home SB may not communicate with the PCH 213-0 recognized by the OS. Thus, it is difficult for the new Home BMC to provide a service accompanying communication with the OS.

Figure 3:
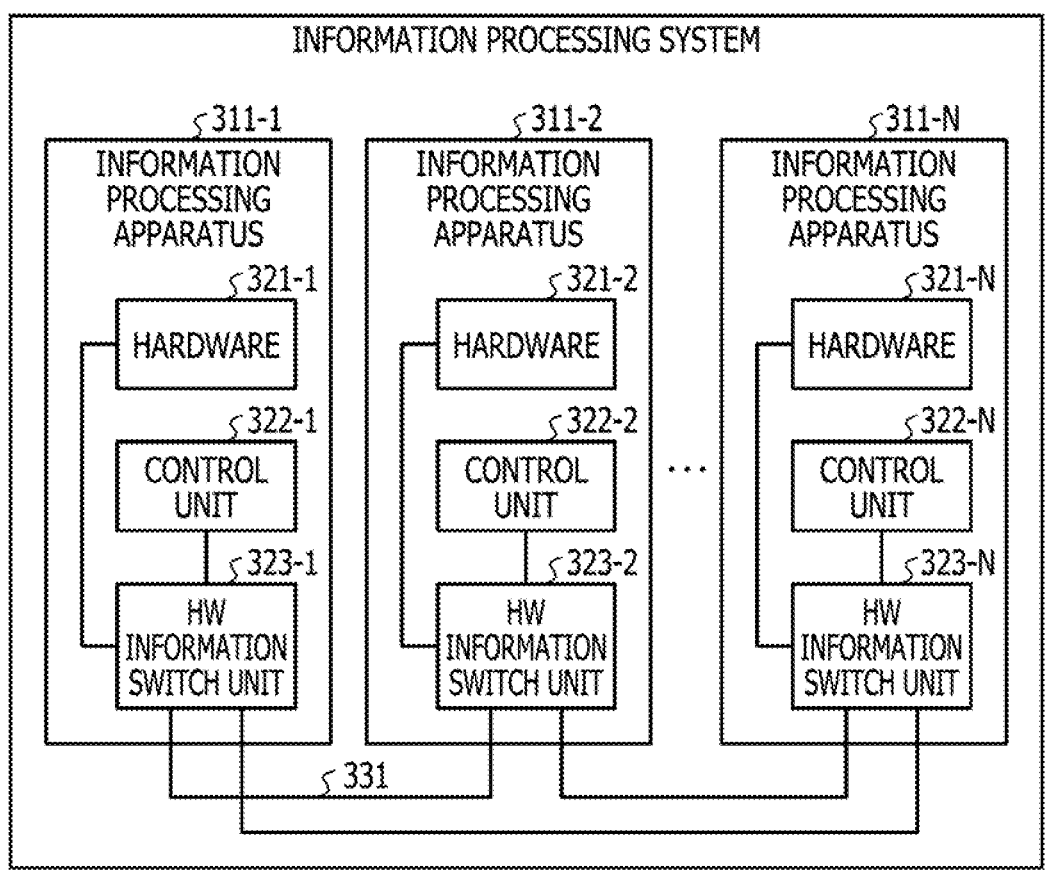
FIG. 3 is a configuration diagram of the information processing system.

FIG. 3 illustrates a configuration example of an information processing system of the embodiment. An information processing system 301 in FIG. 3 includes information processing apparatuses 311-1 to 311-N (N is an integer of 2 or more). Each information processing apparatus 311-$i$ ($i=1$ to N) includes hardware 321-$i$, a control unit 322-$i$, and a hardware (HW) information switch unit 323-$i$.

The control unit 322-$i$ manages the hardware 321-$i$, and the HW information switch unit 323-$i$ switches the coupling between another information processing apparatus 311-$k$ ($k \neq i$), the hardware 321-$i$, and the control unit 322-$i$.

In a case where a failure of the control unit 322-1 in the information processing apparatus 311-1 is detected, the HW information switch unit 323-1 performs control for coupling the hardware 321-1 to the HW information signal line 331 between the information processing apparatus 311-1 and the information processing apparatus 311-2. At this time, the HW information switch unit 323-1 performs control for coupling the hardware 321-1 to the HW information signal line 331, according to the HW information control signal received from the outside of the information processing apparatus 311-1.

When a failure of the control unit 322-1 is detected, the HW information switch unit 323-2 performs control to couple the control unit 322-2 to the HW information signal line 331. The control unit 322-2 acquires information output from the hardware 321-1 through the HW information signal line 331.

According to the information processing system 301 illustrated in FIG. 3, in a case where the control unit in one information processing apparatus fails in the information processing system, a control unit in another information processing apparatus may directly acquire information from hardware in the information processing apparatus including the failed control unit.

Figure 4:
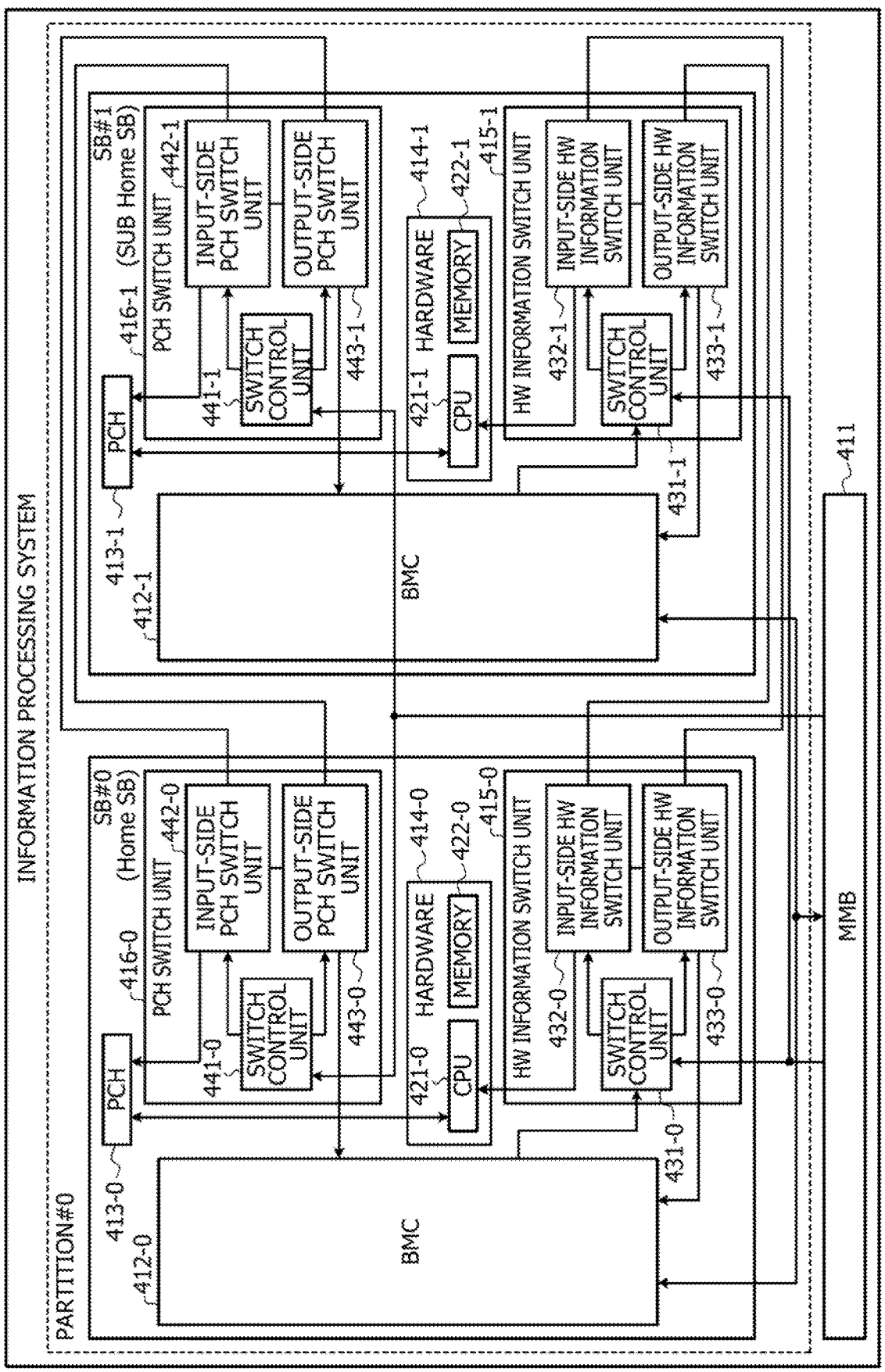
FIG. 4 is a configuration diagram illustrating a first specific example of the information processing system.

FIG. 4 illustrates a first specific example of the information processing system 301 in FIG. 3. The information processing system 401 in FIG. 4 includes partition #0 and MMB 411, and partition #0 includes SB #0 and SB #1. SB #0 is the Home SB of partition #0, and SB #1 is a SubHome SB. SubHome SB is an SB mounted with a BMC that takes over the role of Home BMC when the BMC on Home SB fails.

The SB #$i$ ($i=0, 1$) includes a BMC 412-$i$, a PCH 413-$i$, hardware 414-$i$, a HW information switch unit 415-$i$, and a PCH switch unit 416-$i$. The hardware 414-$i$ includes a CPU 421-$i$ and a memory 422-$i$. The hardware 414-$i$ may include other hardware devices such as voltage sensors and temperature sensors. The BMC 412-$i$ manages and monitors the hardware 414-$i$.

Each of SB #0 and SB #1 corresponds to the information processing apparatus 311-$i$ in FIG. 3. The partition #0 may include three or more SBs. In this case, each SB has the same configuration as SB #0 and SB #1.

MMB 411 may communicate with BMC 412-0 and BMC 412-1 through a private LAN, and the BMC 412-0 may communicate with BMC 412-1 through a private LAN.

The MMB 411 may set up SubHome SB when a partition is created by the user and Home SB is set. For example, the MMB 411 selects an SB with the smallest number i included in the identification information "SB #i" among SBs other than Home SB included in the partition, as a SubHome SB. In a case where the BMC on the SubHome SB fails before the BMC on the Home SB, the MMB 411 selects the SB having the next smallest number i as a new SubHome SB.

In a case where the BMCs on the SBs other than the Home SB fails, among the BMCs on the SBs included in the partition, the SubHome SB is not set because BMC redundancy is no longer available.

The PCH 413-*i* manages communication between the CPU 421-*i* and the peripheral IO device. The PCH 413-*i* and the CPU 421-*i* are coupled by a signal line such as a DMI bus. After the OS is started on the CPU 421-0, the OS may recognize only the PCH 413-0 on the Home SB. The PCH 413-*i* is an example of a communication management unit.

The HW information switch unit 415-*i* includes a switch control unit 431-*i*, an input-side HW information switch unit 432-*i*, and an output-side HW information switch unit 433-*i*. The input-side HW information switch unit 432-*i* is coupled to the hardware 414-*i* and the output-side HW information switch units 433-0 and 433-1 by HW information signal lines of I2C or the like. In a case where the information processing system 401 includes three or more SBs, the input-side HW information switch unit 432-*i* is coupled to the output-side HW information switch unit 433-*i* on all SBs.

The output-side HW information switch unit 433-*i* is coupled to the BMC 412-*i*, the input-side HW information switch units 432-0 and 432-1 by HW information signal lines of the I2C or the like. In a case where the information processing system 401 includes three or more SBs, the output-side HW information switch unit 433-*i* is coupled to the input-side HW information switch unit 432-*i* on all SBs.

The switch control unit 431-*i* changes the coupling of the HW information signal lines by switching the input-side HW information switch unit 432-*i* and the output-side HW information switch unit 433-*i*.

The BMC 412-*i* and the MMB 411 are coupled to the switch control unit 431-*i* by signal lines of GPIO or the like. The BMC 412-*i* may also access any hardware 414-*i* on SB #0 or SB #1 by switching the input-side HW information switch unit 432-*i* and the output-side HW information switch unit 433-*i* through the switch control unit 431-*i*. The MMB 411 may switch the input-side HW information switch unit 432-*i* and the output-side HW information switch unit 433-*i* through the switch control unit 431-*i*.

The PCH switch unit 416-*i* includes a switch control unit 441-*i*, an input-side PCH switch unit 442-*i*, and an output-side PCH switch unit 443-*i*. The PCH switch unit 416-*i*, the input-side PCH switch unit 442-*i*, and the output-side PCH switch unit 443-*i* are examples of the processor communication switch unit, the input-side processor communication switch unit, and the output-side processor communication switch unit.

The input-side PCH switch unit 442-*i* is coupled to the PCH 413-*i* and the output-side PCH switch units 443-0 and 443-1 by PCH signal lines such as an LPC bus. In a case where the information processing system 401 includes three or more SBs, the input-side PCH switch unit 442-*i* is coupled to the output-side PCH switch unit 443-*i* on all SBs.

The output-side PCH switch unit 443-*i* is coupled to the BMC 412-*i* and the input-side PCH switch units 442-0 and 442-1 by PCH signal lines such as an LPC bus. In a case where the information processing system 401 includes three or more SBs, the output-side PCH switch unit 443-*i* is coupled to the input-side PCH switch unit 442-*i* on all SBs.

The LPC bus is a bus for supporting legacy IO devices. An OS operating on the CPU 421-*i* may communicate with a BMC 412-*i* through a PCH 413-*i* by a KCS interface through an LPC bus. A PCH signal line such as an LPC bus is an example of a processor communication signal line.

The switch control unit 441-*i* changes the coupling of the PCH signal lines by switching the input-side PCH switch unit 442-*i* and the output-side PCH switch unit 443-*i*.

The MMB 411 is coupled to the switch control unit 441-*i* by signal lines of GPIO or the like. The MMB 411 switches the input-side PCH switch unit 442-*i* and the output-side PCH switch unit 443-*i* through the switch control unit 441-*i*. Thus, the BMC 412-*i* may access any PCH 413-*i* on the SB #0 or SB #1.

Figure 5:
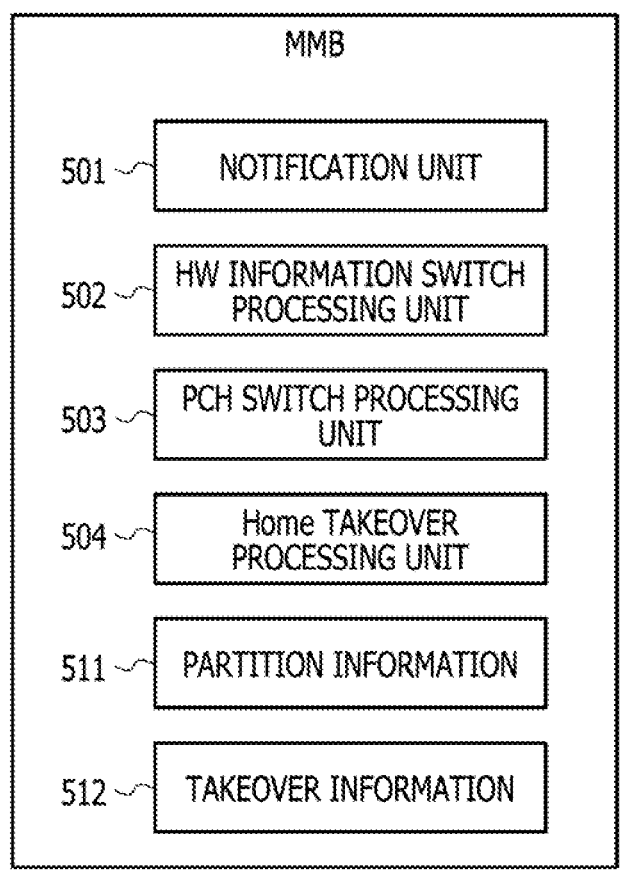
FIG. 5 is a functional configuration diagram of an MMB.

FIG. 5 illustrates a functional configuration example of the MMB 411 of FIG. 4. The MMB 411 in FIG. 5 includes a notification unit 501, a HW information switch processing unit 502, a PCH switch processing unit 503, and a Home takeover processing unit 504, and holds partition information 511 and takeover information 512.

The partition information 511 is information indicating the partition configuration in the information processing system 401. The partition information 511 includes identification information of each SB belonging to each partition. The partition information 511 includes identification information indicating the Home SB of each partition, identification information indicating the SubHome SB of each partition, and identification information indicating the SB including the Home BMC of each partition.

In the example of FIG. 4, the identification information of the Home SB is "SB #0", the identification information of the SubHome SB is "SB #1", and the identification information of the SB including the Home BMC is "SB #0". The notification unit 501 transmits partition information 511 to each BMC 412-*i*, when a partition is created by the user.

The takeover information 512 is information that is taken over by the BMC 412-1 on the SubHome SB, when the BMC 412-0 (Home BMC) on the Home SB fails. In a case where the takeover information 512 is synchronized between the BMC 412-0 and the MMB 411, and the BMC 412-0 fails, the BMC 412-1 as the new Home BMC acquires the takeover information 512 from the MMB 411.

The takeover information 512 includes error monitoring information, system event log (SEL) information, non-volatile random access memory (NVRAM) information, BMC internal variables, BIOS information, LPC setting information, and KCS setting information.

The error monitoring information, the SEL information, and the NVRAM information are stored in NVRAM (not illustrated) provided over Home SB, and BMC internal variables and BIOS information are stored in the memory in Home BMC. LPC setting information and KCS setting information are stored in the CPU in the Home BMC.

The error monitoring information is sensor data acquired from the hardware 414-*i* on each SB in the partition by the Home BMC. Therefore, the error monitoring information includes not only sensor data output by the hardware 414-0 on the Home SB but also sensor data output by the hardware 414-1 on the SubHome SB.

BMC internal variables are variables set by the user for the Home BMC to manage and monitor the hardware 414-*i*, and BIOS information is information used for communication among BMC-PCH-OS. The SEL information is information indicating a history of system events in the partition, and the NVRAM information is information other than the SEL information stored in the NVRAM on the Home SB.

The NVRAM information includes statistical information such as the CPU usage rate and power consumption of each SB in the partition.

The LPC setting information is information used for coupling of the LPC bus, and includes a baud rate, a coupling control method, an IO address of a receiving-side register, and the like. The KCS setting information is information used for coupling of the KCS interface, and includes an IO address of the receiving-side register, control information set by a command from the server management software, and the like. On the other hand, information related to coupling such as a USB and a power management bus (PMBus) is not included in the takeover information 512.

The PCH switch processing unit 503 transmits a PCH control signal to the PCH switch unit 416-$i$ on each SB, according to a partition configuration indicated by partition information 511. The PCH control signal is an example of a processor communication control signal. The PCH switch unit 416-$i$ performs control to switch the input-side PCH switch unit 442-$i$ and the output-side PCH switch unit 443-$i$, according to the received PCH control signal.

When the partition is constructed, the input-side PCH switch unit 442-$i$ and the output-side PCH switch unit 443-$i$ are switched such that the PCH 413-$i$ and BMC 412-$i$ on the same SB are coupled. The BMC 412-0 communicates with the OS operating on the CPU 421-0 through the PCH 413-0.

The Home takeover processing unit 504 checks whether or not the BMC 412-0 is operating normally, and transmits the takeover information 512 to the BMC 412-1, in a case of detecting a failure of the BMC 412-0. The Home takeover processing unit 504 changes the identification information of the SB including the home BMC, included in the partition information 511, to "SB #1". The notification unit 501 transmits the changed partition information 511 to the BMC 412-1.

Next, the HW information switch processing unit 502 transmits a HW information control signal to a HW information switch unit 415-0 on the Home SB. The HW information switch unit 415-0 performs a control to couple the hardware 414-0 to a HW information signal line between the input-side HW information switch unit 432-0 and the output-side HW information switch unit 433-1, according to the received HW information control signal.

On the other hand, the PCH switch processing unit 503 transmits a PCH control signal to a PCH switch unit 416-$i$ on each SB. The PCH switch unit 416-0 performs a control to couple the PCH 413-0 to a PCH signal line between the input-side PCH switch unit 442-0 and the output-side PCH switch unit 443-1, according to the received PCH control signal. The PCH switch unit 416-1 performs a control to couple the BMC 412-1 to the same PCH signal line, according to the received PCH control signal. The BMC 412-1 communicates with the OS operating on the CPU 421-0 through the PCH 413-0 coupled to the PCH signal line.

Figure 6:
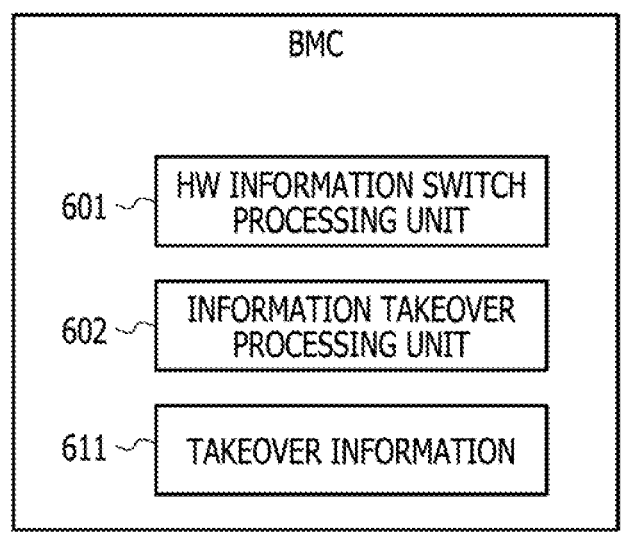
FIG. 6 is a functional configuration diagram of a BMC of the first specific example.

FIG. 6 illustrates a functional configuration example of the BMC 412-$i$ of FIG. 4. BMC 412-$i$ in FIG. 6 includes a HW information switch processing unit 601 and an information takeover processing unit 602, and holds takeover information 611. However, only the BMC on the Home SB holds the takeover information 611, and the other BMC 412-$i$ does not hold the takeover information 611.

Of the takeover information 611, error monitoring information, SEL information, and NVRAM information are acquired from the NVRAM provided outside the BMC 412-$i$, and LPC setting information and KCS setting information are acquired from the CPU in the BMC 412-$i$. BMC internal variables and BIOS information are stored in the memory in the BMC 412-$i$.

When any information included in the takeover information 611 is updated, the takeover information 512 in FIG. 5 is updated synchronously. For example, when new sensor data is acquired, the sensor data is immediately transmitted to the MMB 411, and when the BMC internal variable is changed, the BMC internal variable is immediately transmitted to the MMB 411. Thus, the MMB 411 may acquire the information updated on the Home SB without delay.

The HW information switch processing unit 601 outputs an HW information control signal to the HW information switch unit 415-$i$, according to the partition configuration indicated by the partition information 511 received from the MMB 411. The HW information switch unit 415-$i$ performs a control to switch the input-side HW information switch unit 432-$i$ and the output-side HW information switch unit 433-$i$, according to the received HW information control signal.

When the partition is constructed, the input-side HW information switch unit 432-$i$ and the output-side HW information switch unit 433-$i$ are switched such that the hardware 414-$i$ on each SB and the BMC 412-0 on the Home SB are coupled. The BMC 412-0 obtains sensor data output from the hardware 414-0 and the hardware 414-1.

The information takeover processing unit 602 of the BMC 412-1 detects that the BMC 412-1 is set in the Home BMC, based on the identification information "SB #1" of the SB including the Home BMC, included in the changed partition information 511 received from the MMB 411.

Next, the information takeover processing unit 602 stores the takeover information 512 received from the MMB 411 as takeover information 611 in the memory in the BMC 412-1. The information takeover processing unit 602 stores error monitoring information, SEL information, and NVRAM information among the takeover information 611 in the NVRAM, and stores the LPC setting information and the KCS setting information in a register of the CPU in the BMC 412-1.

The HW information switch processing unit 601 of the BMC 412-1 outputs a HW information control signal to a HW information switch unit 415-1. The HW information switch unit 415-1 performs a control to couple the BMC 412-1 to a HW information signal line between the input-side HW information switch unit 432-0 and the output-side HW information switch unit 433-1, according to the received HW information control signal. The BMC 412-1 obtains sensor data output from the hardware 414-0, through the HW information signal line.

According to the information processing system 401 in FIG. 4, the MMB 411 may directly control the HW information switch unit 415-$i$ without going through the BMC 412-$i$ on each SB. Therefore, in a case of detecting a failure of the Home BMC, the MMB 411 may switch the Home BMC from BMC 412-0 to BMC 412-1, and forcibly couple the hardware 414-0 on the Home SB to the SubHome SB.

The BMC 412-1 notified as the new Home BMC from the MMB 411 may directly acquire sensor data from the hardware 414-0 by controlling the HW information switch unit 415-1.

The MMB 411 may also directly control the PCH switch unit 416-$i$ on each SB. Therefore, in a case where the Home BMC is switched from BMC 412-0 to BMC 412-1, the MMB 411 may forcibly couple the PCH 413-0 on the Home SB to the BMC 412-1 on the SubHome SB. Thus, the BMC 412-1 may provide a service involving communication with the OS, while communicating with the OS operating on the CPU 421-0 through the PCH 413-0.

By synchronizing the takeover information between the Home BMC and the MMB 411, in a case where the Home BMC fails, the new Home BMC may take over the information managed by the failed Home BMC. Thus, the error monitoring information, the SEL information, the NVRAM information, the BMC internal variables, the BIOS information, the LPC setting information, and the KCS setting information are taken over to the new Home BMC.

Thus, when the BMC on the Home SB fails, another BMC in the same partition may automatically take over the role of the Home BMC without stopping the information processing system 401. Therefore, hardware management and monitoring are continued without stopping the system operation. Even if any BMC in the partition fails, the system operation may be continued as long as all BMCs do not fail.

Next, a specific example in a case where the information processing system 401 in FIG. 4 includes SB #0 to SB #3 will be described with reference to FIGS. 7 to 16.

Figure 7:
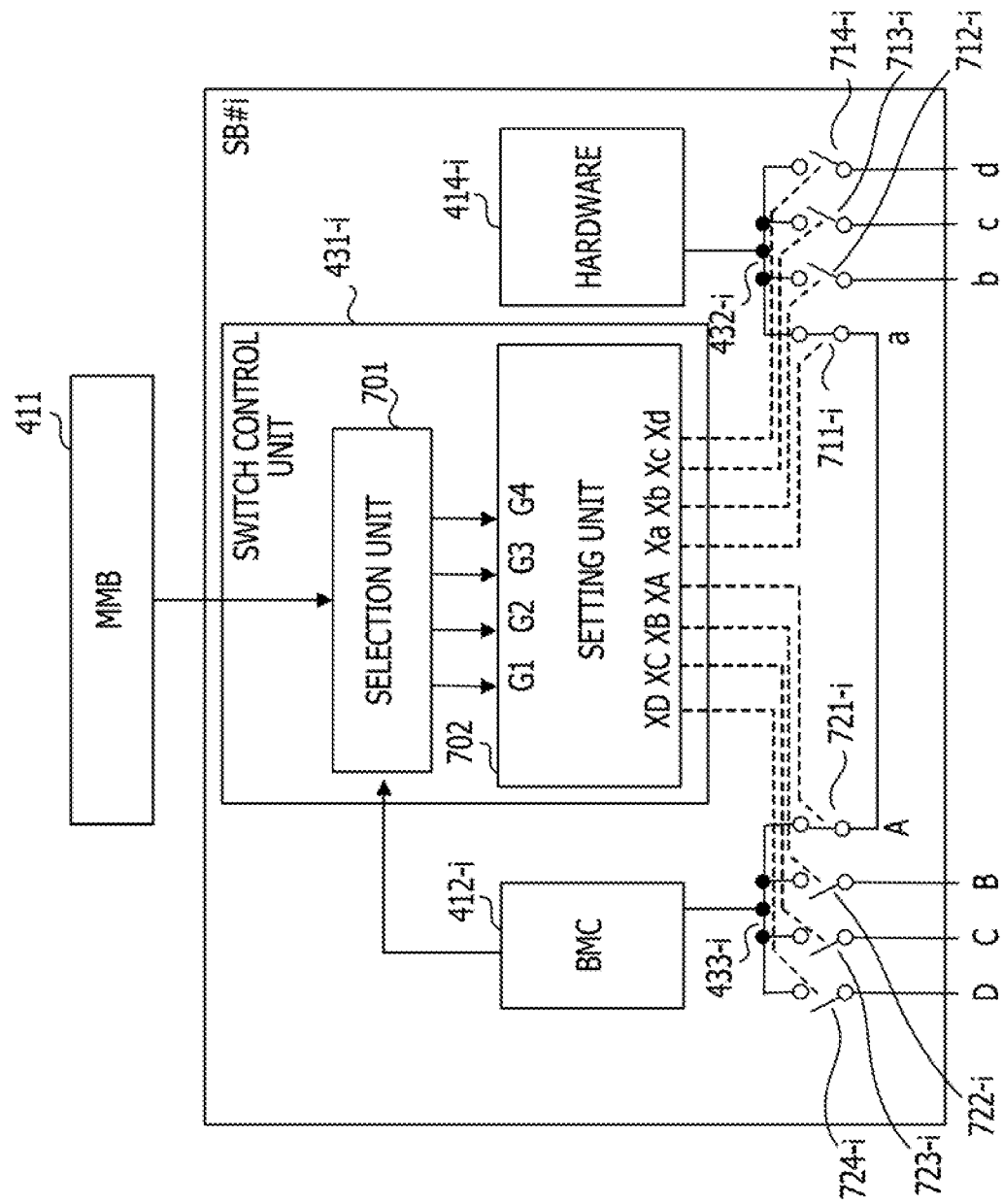
FIG. 7 is a configuration diagram of a HW information switch unit of the first specific example.

FIG. 7 illustrates a configuration example of the HW information switch unit 415-i in FIG. 4. The switch control unit 431-i includes a selection unit 701 and a setting unit 702, the input-side HW information switch unit 432-i includes switches 711-i to 714-i, and an output-side HW information switch unit 433-i includes switches 721-i to 724-i.

The switch 711-i switches coupling between a port a and the hardware 414-i. The switch 712-i switches the coupling between a port b and the hardware 414-i. The switch 713-i switches coupling between a port c and the hardware 414-i. The switch 714-i switches the coupling between a port d and the hardware 414-i.

The switch 721-i switches coupling between a port A and the BMC 412-i. The switch 722-i switches the coupling between a port B and the BMC 412-i. The switch 723-i switches coupling between a port C and the BMC 412-i. The switch 724-i switches the coupling between a port D and the BMC 412-i. The port a of the switch 711-i and the port A of the switch 721-i are coupled by an in-device HW information signal line.

The BMC 412-i and the MMB 411 output control signals G1 to G4 for switching the input-side HW information switch unit 432-i and the output-side HW information switch unit 433-i, to the switch control unit 431-i. The selection unit 701 selects one of the control signals G1 to G4 of the BMC 412-i or the MMB 411 according to the selection signal from the MMB 411, and outputs the selected control signal to the setting unit 702.

Control signals G1 to G4 output to the setting unit 702 are examples of HW information control signals. Among the control signals, the control signals G1 and G2 are control signals for switching the output-side HW information switch unit 433-i, and the control signals G3 and G4 are control signals for switching the input-side HW information switch unit 432-i.

The setting unit 702 respectively outputs control signals XA to XD to the switches 721-i to 724-i, based on the control signals G1 and G2. The setting unit 702 respectively outputs control signals Xa to Xd to the switches 711-i to 714-i, based on the control signals G3 and G4.

Figure 8:
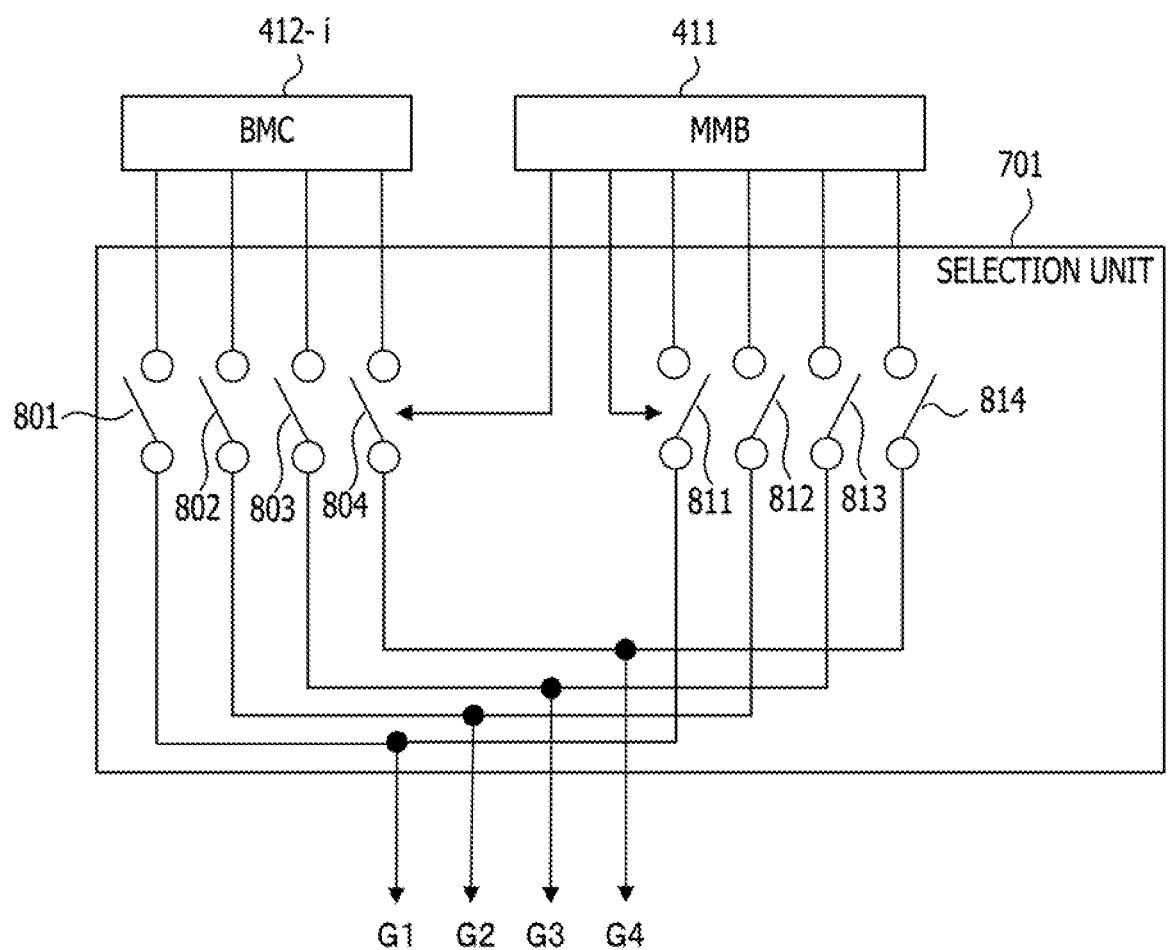
FIG. 8 is a configuration diagram of a selection unit of the first specific example.

FIG. 8 illustrates a configuration example of the selection unit 701 of FIG. 7. The selection unit 701 includes switches 801 to 804 and switches 811 to 814. The switches 801 to 804 and 811 to 814 are set to ON or OFF by a selection signal transmitted from the MMB 411.

In a case where the switches 801 to 804 are set to ON and the switches 811 to 814 are set to OFF, the control signals G1 to G4 from the BMC 412-i are output to the setting unit 702. In a case where the switches 801 to 804 are set to OFF and the switches 811 to 814 are set to ON, the control signals G1 to G4 from the MMB 411 are output to the setting unit 702.

The MMB 411 may output the control signals G1 to G4 to the setting unit 702, by transmitting the selection signal to the selection unit 701. On the other hand, the BMC 412-i may output the control signals G1 to G4 to the setting unit 702 by requesting the switching operation of the selection unit 701 to the MMB 411.

FIGS. 9A and 9B illustrate examples of the control signals G1 to G4 of FIG. 7. FIG. 9A illustrates examples of the control signals G1 and G2 for switching the output-side HW information switch units 433-i. For example, in a case where both the control signals G1 and G2 are logic "0", the switch 721-i is set to ON, and the switches 722-i to 724-i are set to OFF. Consequently, the BMC 412-i is coupled to the port A of the output-side HW information switch unit 433-i.

Likewise, in a case where the control signal G1 is logic "0", and the control signal G2 is logic "1", the BMC 412-i is coupled to the port B, and in a case where the control signal G1 is logic "1", and the control signal G2 is logic "0", the BMC 412-i is coupled to the port C. In a case where both the control signals G1 and G2 are logic "1", the BMC 412-i is coupled to the port D.

FIG. 9B illustrates examples of the control signals G3 and G4 for switching the input-side HW information switch unit 432-i. For example, in a case where both the control signals G3 and G4 are logic "0", the switch 711-i is set to ON, and the switches 712-i to 714-i are set to OFF. Consequently, the hardware 414-i is coupled to the port a of the input-side HW information switch unit 432-i.

Likewise, in a case where the control signal G1 is logic "0", and the control signal G2 is logic "1", the hardware 414-i is coupled to the port b, and in a case where the control signal G1 is logic "1", and the control signal G2 is logic "0", the hardware 414-i is coupled to the port c. In a case where both the control signals G1 and G2 are logic "1", the hardware 414-i is coupled to the port d.

According to the configuration of FIG. 7, the switch control unit 431-i may switch the coupling destination of the hardware 414-i by the input-side HW information switch unit 432-i, and may switch the coupling destination of BMC 412-i by the output-side HW information switch unit 433-i.

Figure 10:
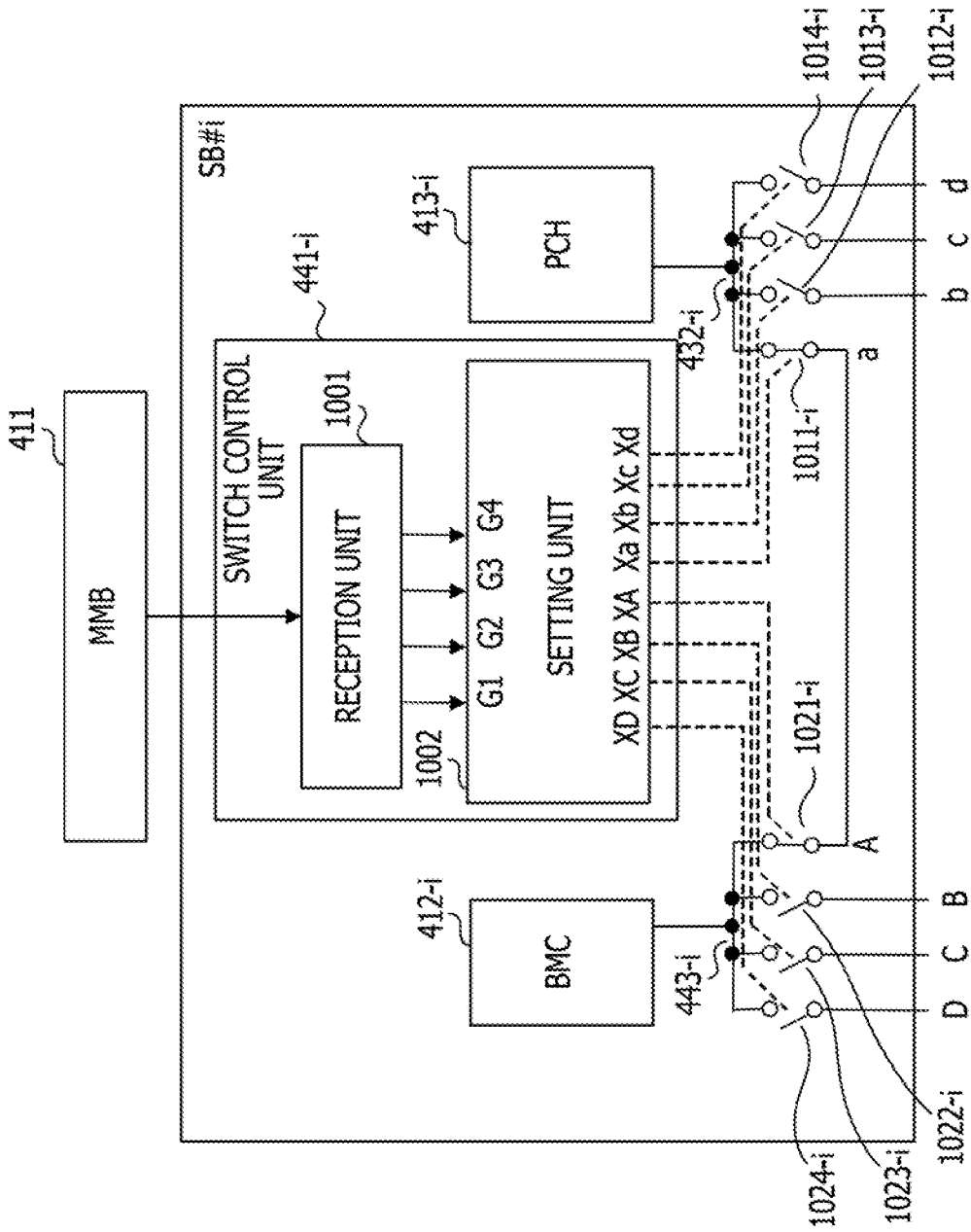
FIG. 10 is a configuration diagram of a PCH switch unit.

FIG. 10 illustrates a configuration example of the PCH switch unit 416-i in FIG. 4. The switch control unit 441-i includes a reception unit 1001 and a setting unit 1002, the input-side PCH switch unit 442-i includes switches 1011-i to 1014-i, and the output-side PCH switch unit 443-i includes switches 1021-i to 1024-i.

The operations of the switches 1011-i to 1014-i are the same as the operations of the switches 711-i to 714-i in FIG. 7, and the operations of the switches 1021-i to 1024-i are the same as the operations of the switches 721-i to 724-i in FIG. 7. The port a of the switch 1011-i and the port A of the switch 1021-i are coupled by a PCH signal line in the apparatus.

The MMB 411 transmits control signals G1 to G4 for switching the input-side PCH switch unit 442-i and the output-side PCH switch unit 443-i, to the switch control unit 441-i. The reception unit 1001 receives the control signals G1 to G4 from the MMB 411, and outputs the control signals to the setting unit 1002.

Control signals G1 to G4 output to the setting unit 1002 are examples of PCH control signals. Among the control signals, the control signals G1 and G2 are control signals for switching the output-side PCH switch unit 443-*i*, and the control signals G3 and G4 are control signals for switching the input-side PCH switch unit 442-*i*.

The setting unit 1002 respectively outputs control signals XA to XD to the switches 1021-*i* to 1024-*i*, based on the control signals G1 and G2. The setting unit 1002 respectively outputs control signals Xa to Xd to the switches 1011-*i* to 1014-*i*, based on the control signals G3 and G4. The correspondence relationship between the control signals G1 to G4 and the coupling destination port is the same as in FIGS. 9A and 9B.

According to the configuration of FIG. 10, the switch control unit 441-*i* may switch the coupling destination of the PCH 413-*i* by the input-side PCH switch unit 442-*i*, and may switch the coupling destination of BMC 412-*i* by the output-side PCH switch unit 443-*i*.

Figure 11:
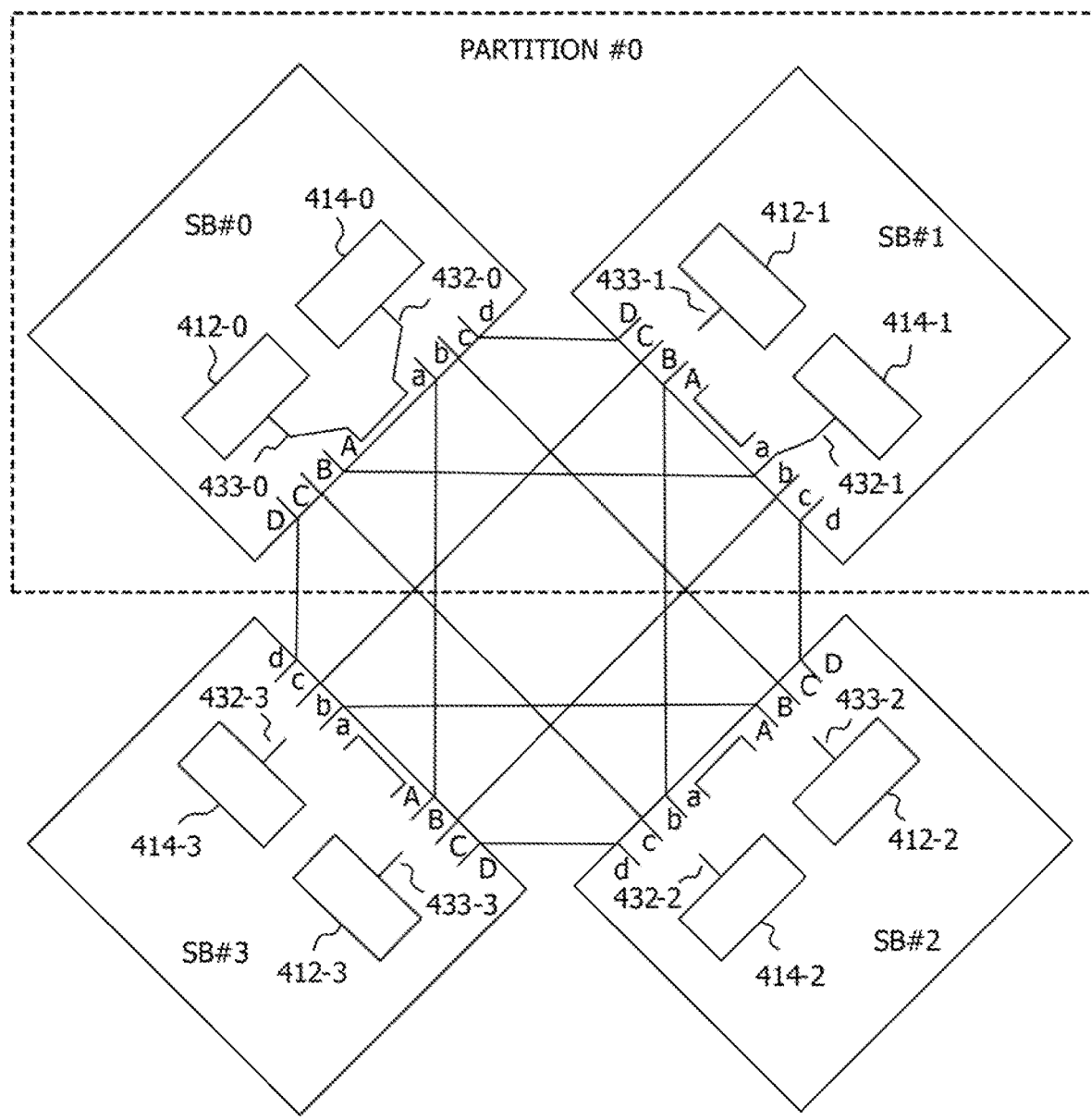
FIG. 11 is a diagram illustrating switch control in which BMC on SB #0 accesses hardware on SB #0.

FIG. 11 illustrates an example of switch control when the BMC on the Home SB accesses hardware on the same SB. The ports a to d in each SB #i indicate the ports of the input-side HW information switch unit 432-*i*, and the ports A to D indicate the ports of the output-side HW information switch unit 433-*i*.

The port A of the SB #0 is coupled to the port a of the SB #0, the port B is coupled to the port b of the SB #1, the port C is coupled to the port c of the SB #2, and the port D is coupled to the port d of the SB #3.

The port A of the SB #1 is coupled to the port a of the SB #1, the port B is coupled to the port b of the SB #2, the port C is coupled to the port c of the SB #3, and the port D is coupled to the port d of the SB #0.

The port A of the SB #2 is coupled to the port a of the SB #2, the port B is coupled to the port b of the SB #3, the port C is coupled to the port c of the SB #0, and the port D is coupled to the port d of the SB #1.

The port A of the SB #3 is coupled to the port a of the SB #3, the port B is coupled to the port b of the SB #0, the port C is coupled to the port c of the SB #1, and the port D is coupled to the port d of the SB #2.

The BMC 412-*i* on each SB #i holds information indicating the coupling relationship between the ports A to D and the ports a to d of the SB #0 to SB #3.

In the example of FIG. 11, the partition #0 includes SB #0 and SB #1. The BMC 412-0 on the SB #0, which is the Home SB of the partition #0, is coupled to the port A, and the hardware 414-0 is coupled to the port a. This allows the BMC 412-0 to access the hardware 414-0 on the same SB #0 to obtain sensor data.

For example, when the plurality of hardware devices in the hardware 414-0 are coupled to a bus, the BMC 712-0 acquires sensor data from the hardware devices by sequentially designating the addresses of the hardware devices.

Figure 12:
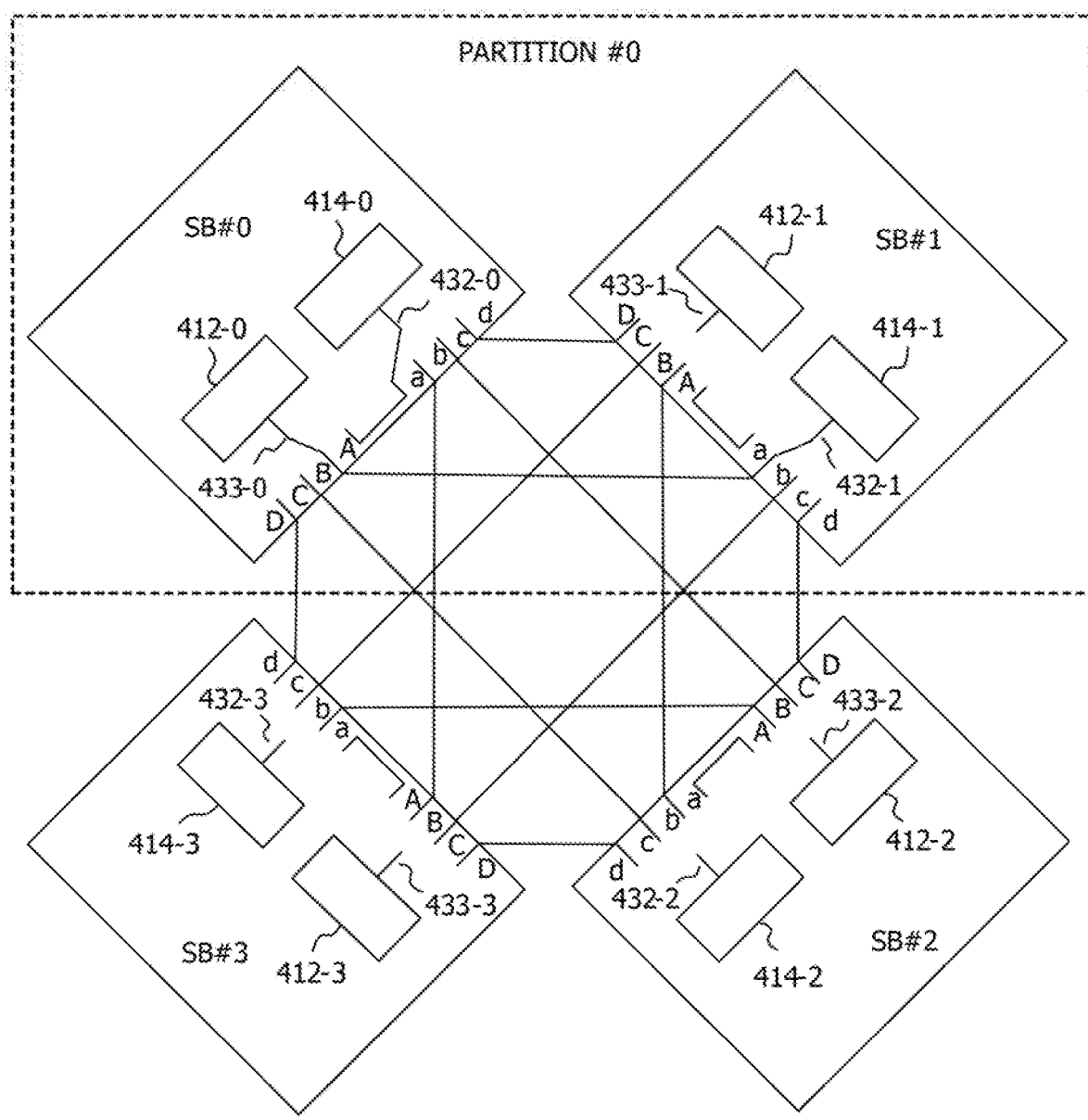
FIG. 12 is a diagram illustrating switch control in which BMC on SB #0 accesses hardware on SB #1.

FIG. 12 illustrates an example of switch control when the BMC on the Home SB accesses hardware on the non-Home SB. In this example, BMC 412-0 on SB #0 is coupled to port B, and hardware 414-1 on SB #1, which is a non-Home SB (SubHome SB), is coupled to port b. This allows the BMC 412-0 to access the hardware 414 on the SB #1 to obtain sensor data.

Figure 13:
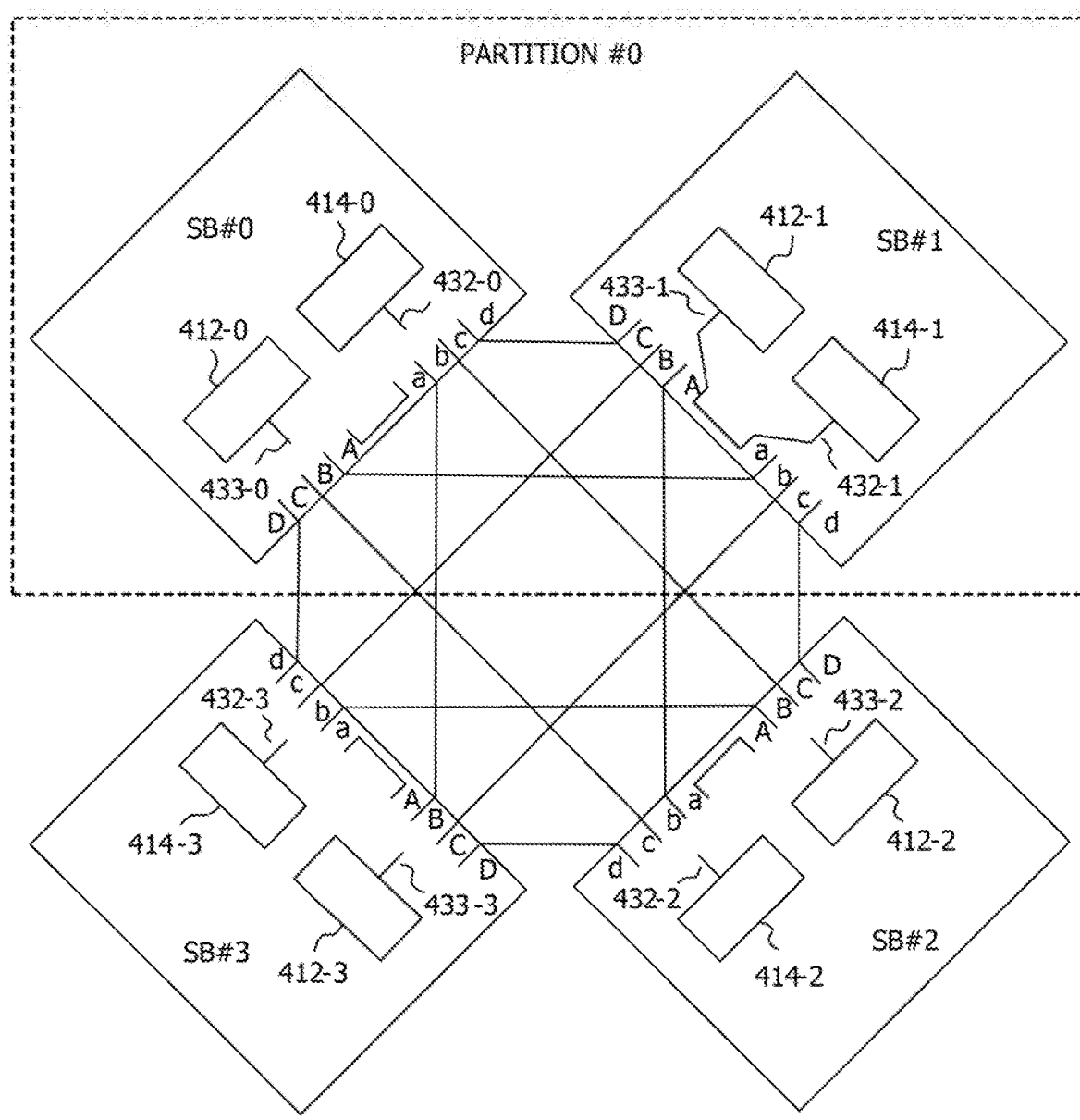
FIG. 13 is a diagram illustrating switch control in which BMC on SB #1 accesses hardware on SB #1.

FIG. 13 illustrates an example of switch control in a case where BMC on SubHome SB accesses hardware on the same SB when Home BMC fails. When BMC 412-0 on SB #0 fails, Home BMC is switched from BMC 412-0 to BMC 412-1, BMC 412-1 on SB #1 is coupled to port A, and hardware 414-1 is coupled to port a. This allows the BMC 412-1 to access the hardware 414-1 on the same SB #1 to obtain sensor data.

Figure 14:
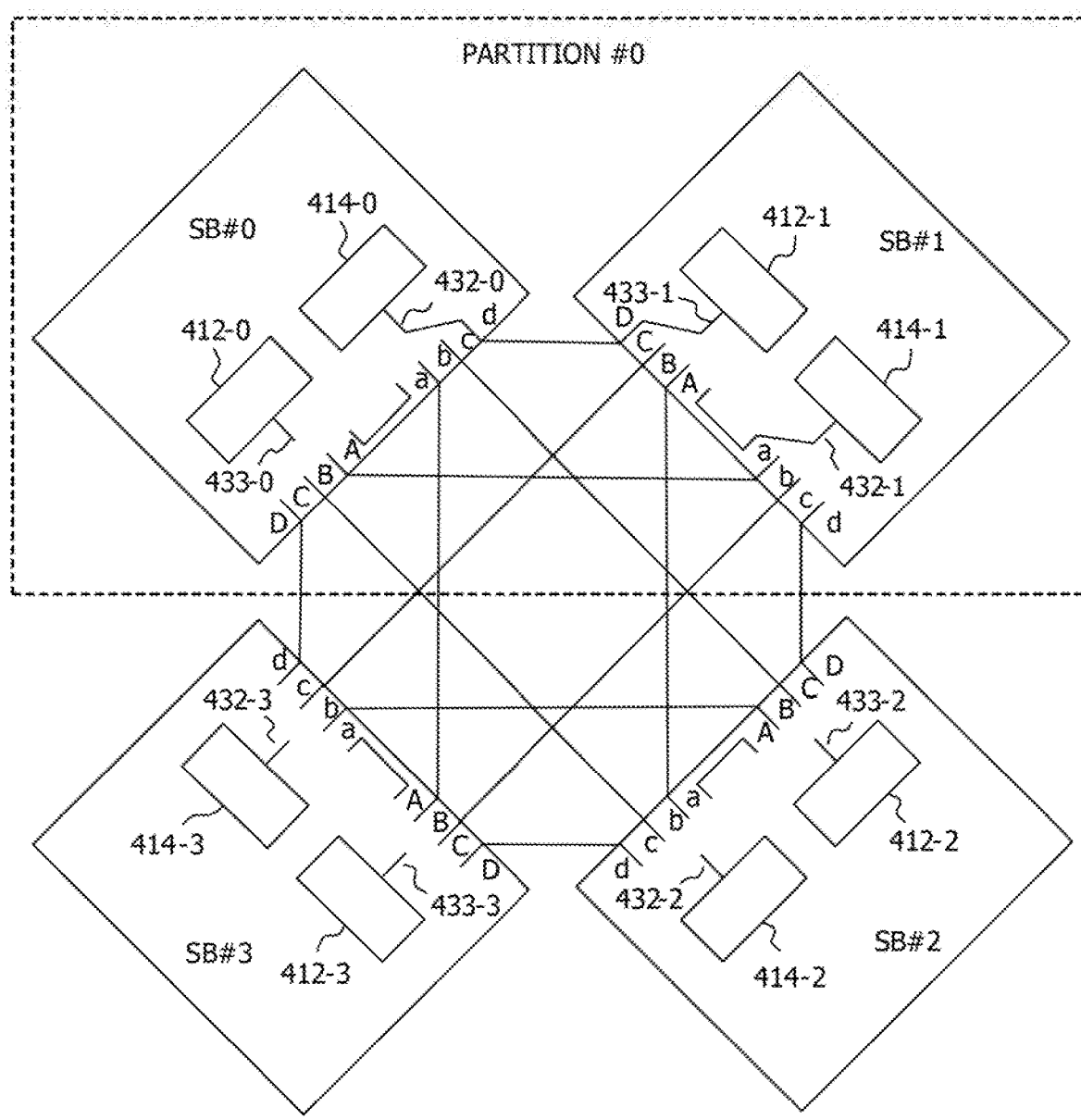
FIG. 14 is a diagram illustrating switch control in which BMC on SB #1 accesses hardware on SB #0.

FIG. 14 illustrates an example of switch control in a case where BMC on SubHome SB accesses hardware on the Home SB when Home BMC fails. In this example, BMC 412-1 on SB #1 is coupled to port D, and hardware 414-0 on SB #0 is coupled to port d. This allows the BMC 412-1 to access the hardware 414-0 on the SB #0 to obtain sensor data.

Figure 15:
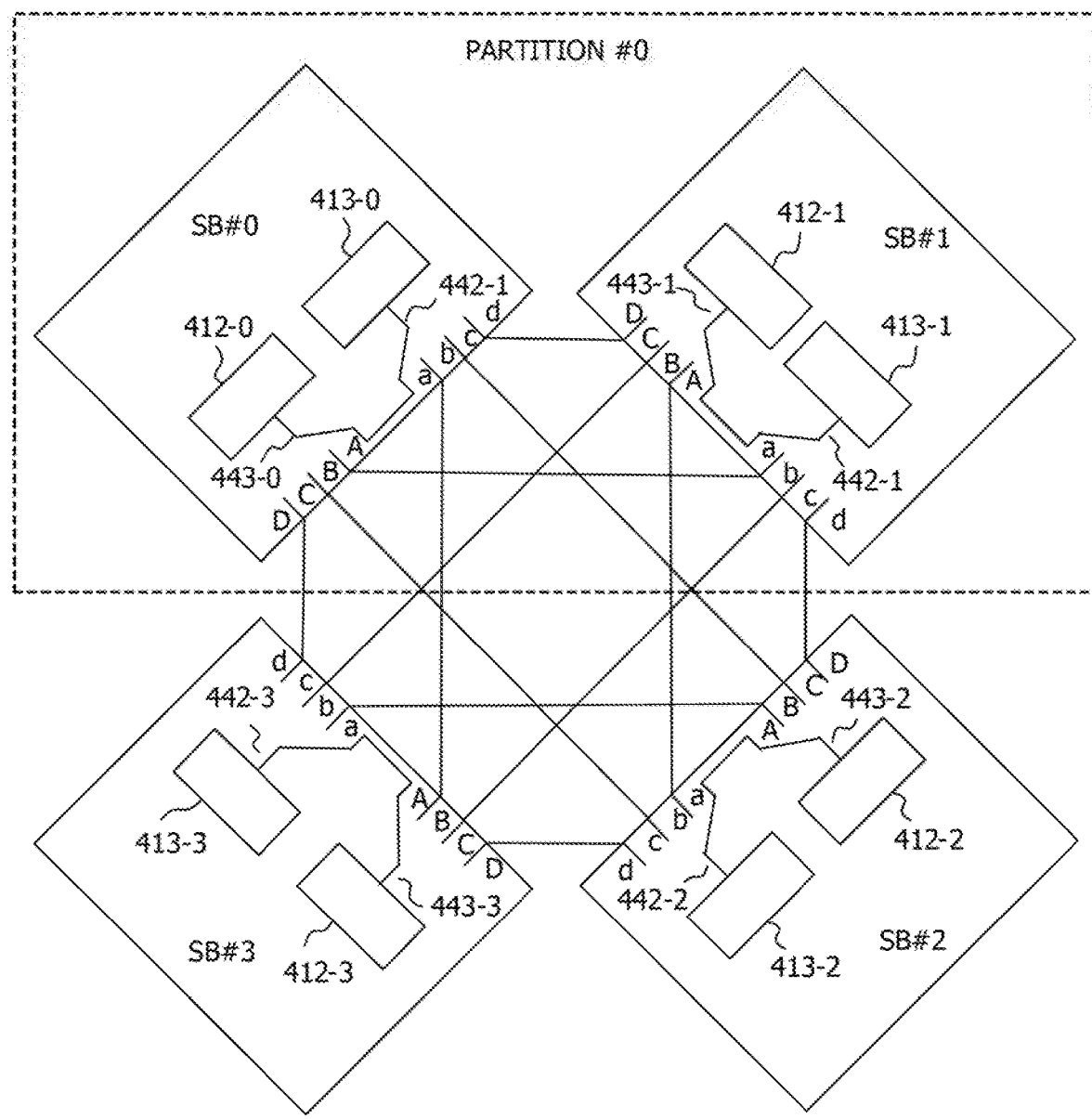
FIG. 15 is a diagram illustrating switch control in which BMC on each SB accesses PCH on the same SB.

FIG. 15 illustrates an example of switch control when the BMC on each SB accesses PCH on the same SB. The ports a to d in each SB #i indicate the ports of the input-side PCH switch unit 442-*i*, and the ports A to D indicate the ports of the output-side PCH switch unit 443-*i*. Port couplings between SBs are the same as in FIG. 11.

In this example, BMC 412-*i* on SB #i is coupled to port A, and PCH 413-*i* is coupled to port a. Therefore, BMC 412-0 on SB #0, which is the Home SB, may access PCH 413-0 on the same SB #0, and communicate with the OS operating on CPU 421-0 through PCH 413-0.

Figure 16:
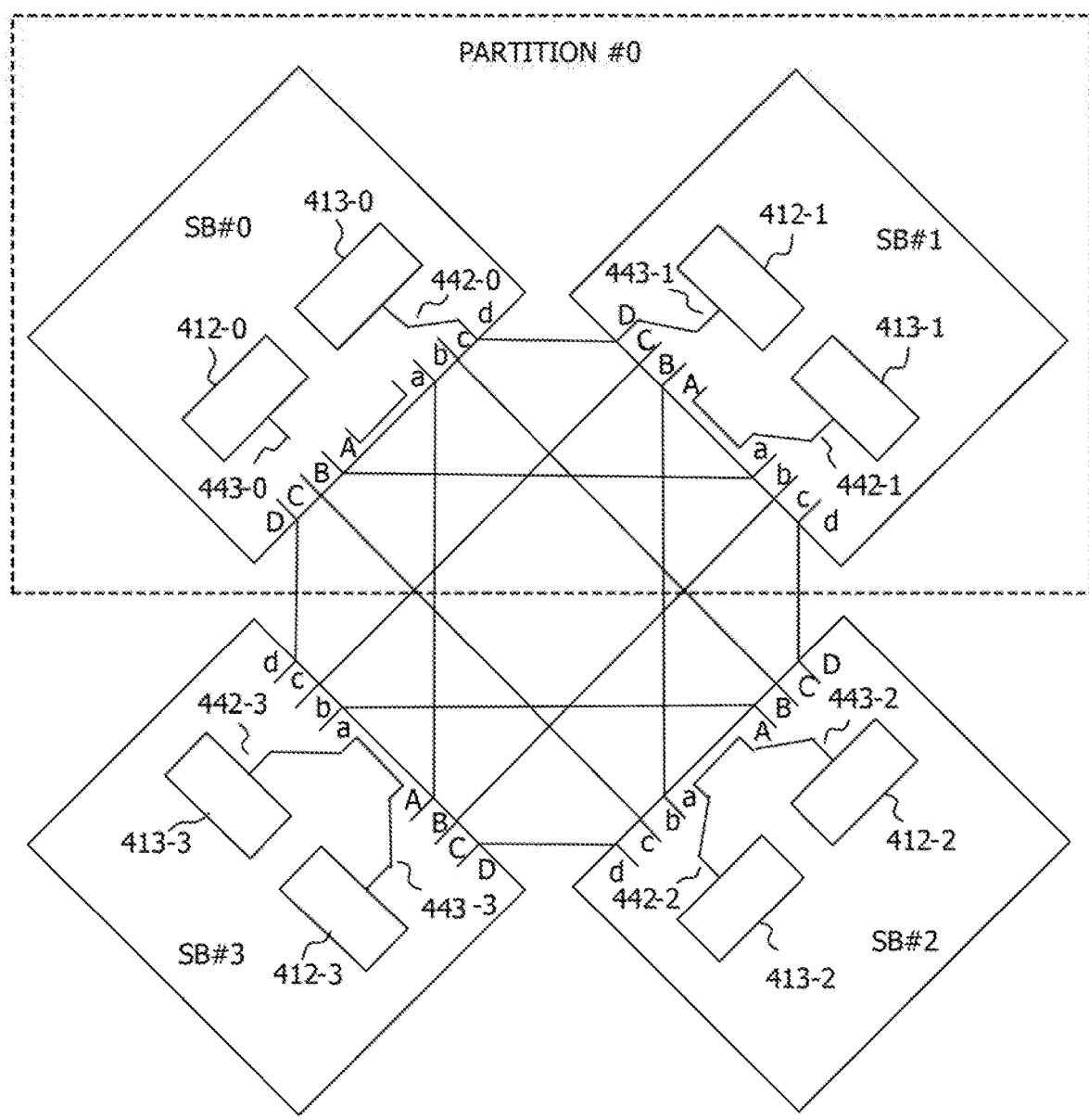
FIG. 16 is a diagram illustrating switch control in which BMC on SB #1 accesses PCH on SB #0.

FIG. 16 illustrates an example of switch control in a case where BMC on SubHome SB accesses PCH on the Home SB when Home BMC fails. When BMC 412-0 on SB #0 fails, Home BMC is switched from BMC 412-0 to BMC 412-1, BMC 412-1 on SB #1 is coupled to port D, and PCH 413-0 on SB #0 is coupled to port d. Therefore, BMC 412-1 may access PCH 413-0 on SB #0, and communicate with the OS operating on CPU 421-0 through PCH 413-0.

Next, a method for detecting the failure of the Home BMC by the MMB 411 will be described. The BMC 412-*i* on each SB transmits a survival checking command to the MMB 411 at regular intervals. The MMB 411 receives the command from the BMC 412-*i*, checks that the BMC 412-*i* is operating normally, and transmits a response to the BMC 412-*i*. The BMC 412-*i* checks that it may communicate with the MMB 411 by receiving the response from the MMB 411.

When the operation of the BMC 412-0 is stopped due to a hardware failure or software defect of the BMC 412-0 on the Home SB, the command from the BMC 412-0 is interrupted, so the MMB 411 determines that the BMC 412-0 has failed.

In the case of a hardware failure, the BMC 412-0 is unlikely to recover naturally, so it is desirable to switch the Home BMC immediately. On the other hand, in the case of a software defect, the BMC 412-0 is likely to be reset and recovered by a watchdog timer or the like. However, in this case, it is considered that the firmware is faulty, so it is desirable to clarify the cause and correct the firmware. Therefore, the Home BMC is switched in any case without distinguishing between hardware failure and software defect.

Even if the failed BMC 412-0 is recovered after switching the Home BMC, there may be a hardware defect in the BMC 412-0 which is once stopped. Therefore, in principle, the Home BMC is not switched again to run the BMC 412-0. In this case, the BMC 412-0 is replaced during maintenance work.

However, when a failed BMC 412-0 is recovered after the Home BMC is switched and a new Home BMC fails in a partition including only two SBs, then the recovered BMC 412-0 may be operated again as the Home BMC.

Figure 17:
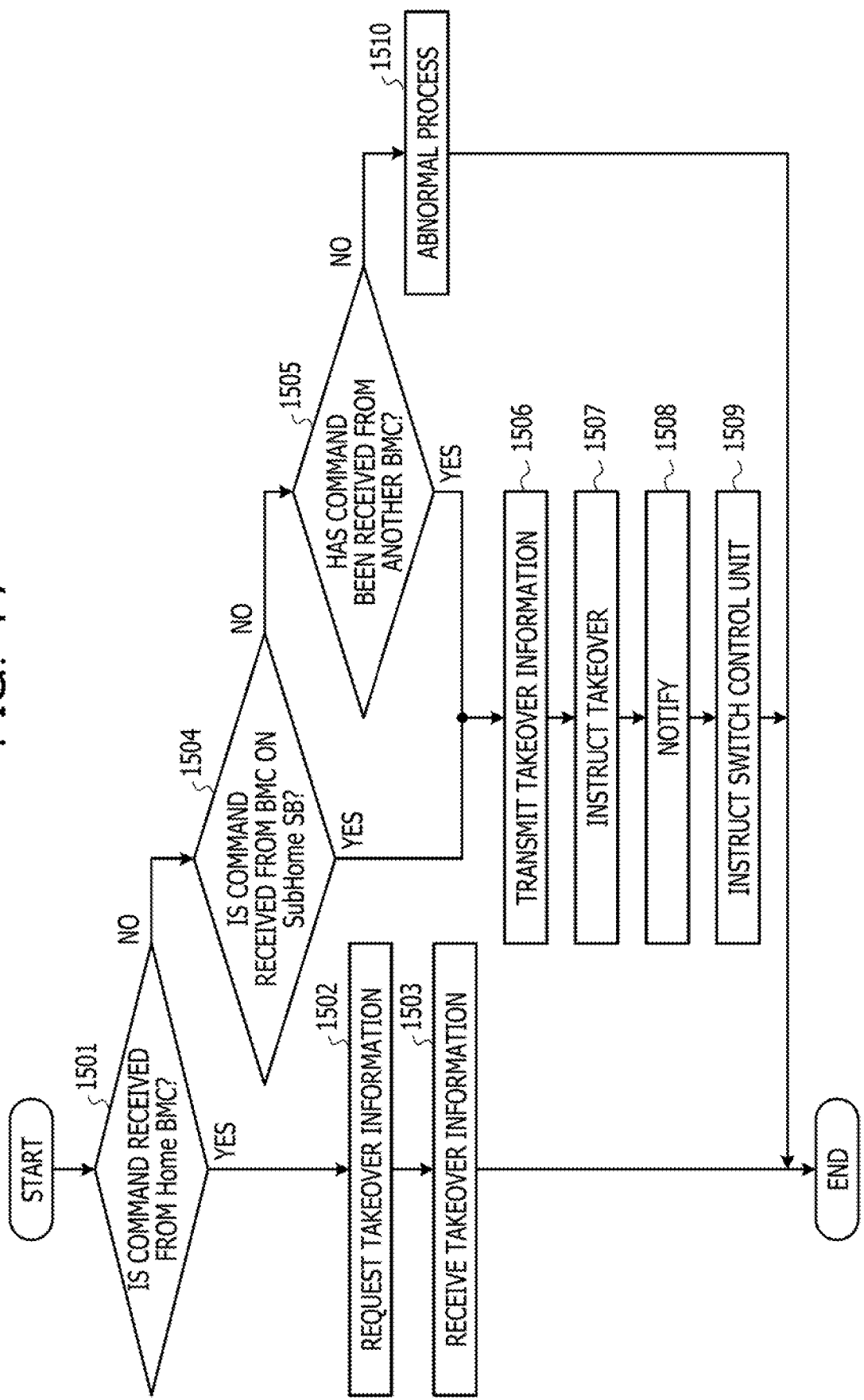
FIG. 17 is a flowchart illustrating a Home takeover process of the first specific example.

FIG. 17 is a flowchart illustrating an example of Home takeover process performed by the MMB 411. First, the BMC on each SB transmits a survival checking command to the MMB 411 at regular intervals, and the Home takeover processing unit 504 of the MMB 411 checks whether a command is received from the Home BMC (step 1501).

When a command is received from the Home BMC (step 1501, YES), the Home takeover processing unit 504 determines that the Home BMC is operating normally and requests the takeover information 611 from the Home BMC (step 1502). The Home takeover processing unit 504 receives the takeover information 611 from the Home BMC, and stores the received takeover information 611 as the takeover information 512 (step 1503).

On the other hand, when the command from the Home BMC is interrupted (step 1501, NO), the Home takeover processing unit 504 determines that the Home BMC has failed and checks whether a command has been received from the BMC on the SubHome SB (step 1504).

When a command is received from the BMC on the SubHome SB (step 1504, YES), the Home takeover processing unit 504 designates the BMC on the SubHome SB as a new Home BMC. The Home takeover processing unit 504 transmits takeover information 512 to the BMC on the SubHome SB (step 1506).

Next, the Home takeover processing unit 504 instructs the BMC on the SubHome SB to start the takeover process (step 1507). The Home takeover processing unit 504 changes the identification information of the SB including the Home BMC included in the partition information 511 from the identification information of the Home SB to the identification information of the SubHome SB. The notification unit 501 notifies the BMC on the SubHome SB of the changed partition information 511 (step 1508).

Next, the Home takeover processing unit 504 instructs the HW information switch processing unit 502 and the PCH switch processing unit 503 to start switch control (step 1509).

On the other hand, when the command from the BMC on the SubHome SB is interrupted (step 1504, NO), the Home takeover processing unit 504 determines that the BMC on the SubHome SB has also failed. The Home takeover processing unit 504 checks whether or not a command has been received from another BMC in the partition (step 1505).

When a command is received from another BMC (step 1504, YES), the Home takeover processing unit 504 designates the BMC that has transmitted the command as a new Home BMC, instead of the BMC on the SubHome SB, and performs step 1506 and the subsequent processing.

When commands from all the BMCs in the partition are interrupted (step 1505, NO), the home takeover processing unit 504 performs an abnormal process (step 1510).

Figure 18:
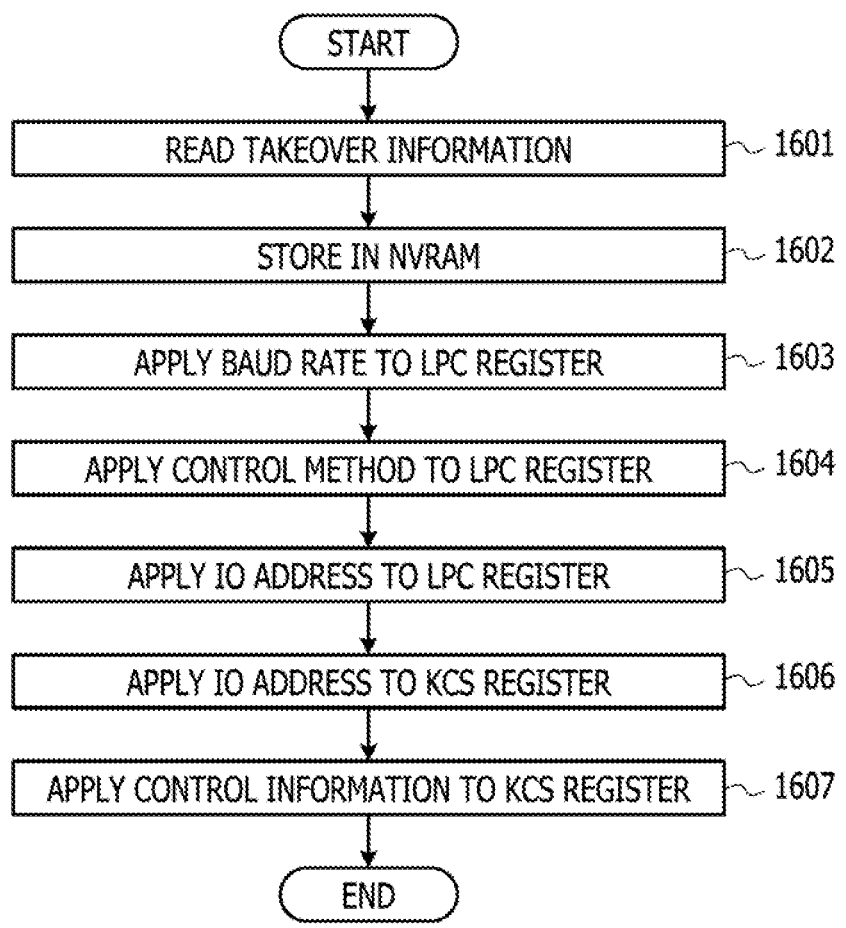
FIG. 18 is a flowchart illustrating an information takeover process.

FIG. 18 is a flowchart illustrating an example of the information takeover process performed by the BMC on the SubHome SB instructed by the MMB 411 to start the takeover process. First, the information takeover processing unit 602 of the BMC on the SubHome SB refers to the identification information of the SB including the Home BMC included in the changed partition information 511 received from the MMB 411.

The information takeover processing unit 602 detects that the BMC on the SubHome SB is set as the Home BMC, based on the referenced identification information. The information takeover processing unit 602 stores the takeover information 512 received from the MMB 411 as takeover information 611 in the memory in the BMC on the SubHome SB.

Next, the information takeover processing unit 602 reads the takeover information 611 (step 1601), and stores the error monitoring information, the SEL information, and the NVRAM information in the NVRAM (step 1602).

Next, the information takeover processing unit 602 applies the baud rate included in the LPC setting information to the LPC register of the CPU in the BMC on the SubHome SB (step 1603). Next, the information takeover processing unit 602 applies the coupling control method included in the LPC setting information to the LPC register (step 1604), and applies the IO address of the reception-side register included in the LPC setting information to the LPC register (step 1605).

Next, the information takeover processing unit 602 applies the IO address of the reception side register included in the KCS setting information to the KCS register of the CPU in the BMC on the SubHome SB (step 1606). Next, the information takeover processing unit 602 applies the control information set by the server management software included in the KCS setting information to the KCS register (step 1607).

According to the information takeover process of FIG. 18, the BIOS information included in the takeover information 512 is stored in the memory in the BMC on the SubHome SB, and the LPC setting information and the KCS setting information are applied to the registers of the CPU in the BMC. Thus, the BMC on the SubHome SB may communicate with the OS operating on the Home SB in the same manner as the BMC on the Home SB.

Figure 19:
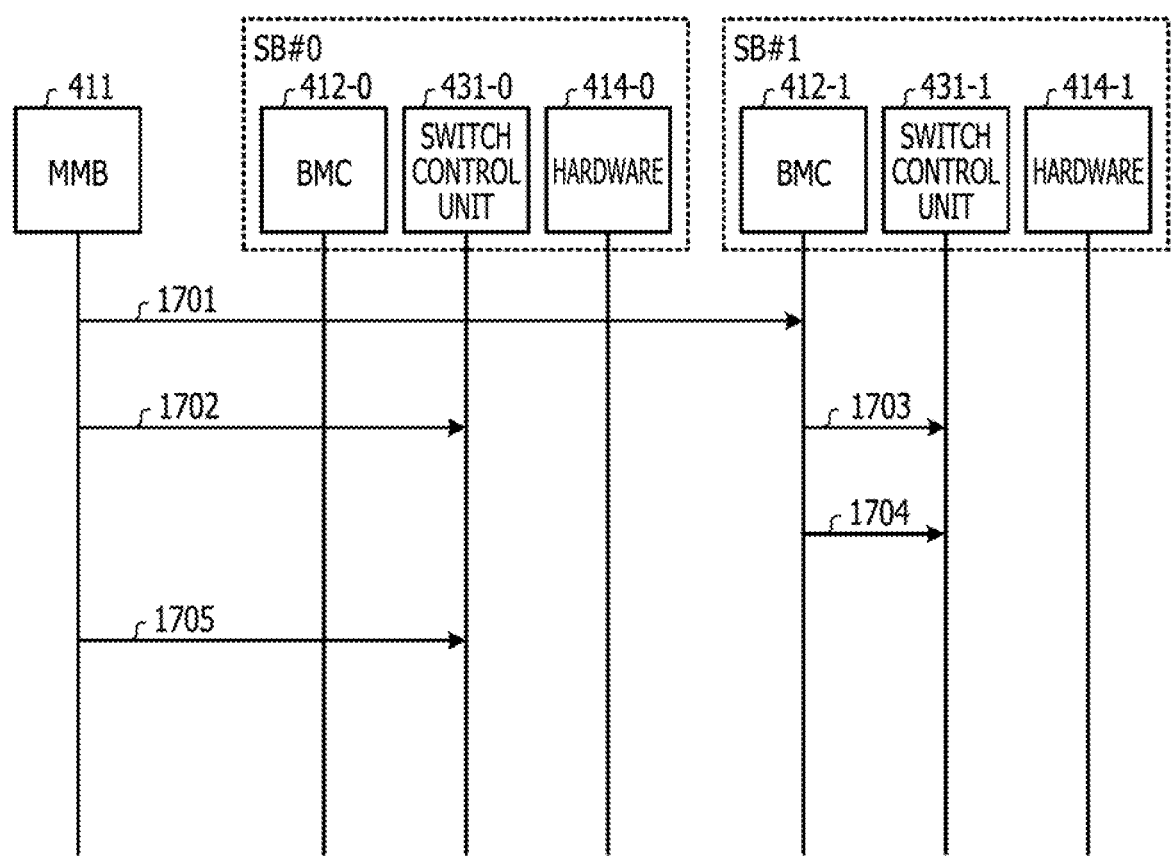
FIG. 19 is a diagram illustrating a sequence of a switch control process performed by a HW information switch processing unit of the MMB.

FIG. 19 illustrates an example of a sequence of switch control process performed by the HW information switch processing unit 502 of the MMB 411 when the Home BMC fails. First, the Home takeover processing unit 504 of the MMB 411 detects a failure of the BMC 412-0 that is the Home BMC, and the notification unit 501 notifies the BMC 412-1 on the SubHome SB of the changed partition information 511 (procedure 1701). Thus, is notified that the Home BMC has been switched from BMC 412-0 to BMC 412-1.

Next, the HW information switch processing unit 502 of the MMB 411 transmits a selection signal for selecting the control signals G1 to G4 of the MMB 411, to the switch control unit 431-0. The selection unit 701 of the switch control unit 431-0 sets the switches 801 to 804 to OFF and sets the switches 811 to 814 to ON, according to the selection signal.

Next, the HW information switch processing unit 502 of the MMB 411 transmits a HW information control signal for decoupling the coupling between the hardware 414-0 and the BMC 412-0 on the SB #0, to the switch control unit 431-0 (procedure 1702).

In this case, the control signal (G1, G2) is set to (0, 1), (1, 0), or (1, 1) and transmitted as the HW information control signal. The setting unit 702 of the switch control unit 431-0 decouples the coupling between the hardware 414-0 and the BMC 412-0 by switching the output-side HW information switch unit 433-0, according to the received control signals (G1, G2).

Next, the HW information switch processing unit 601 of the BMC 412-1 outputs a HW information control signal for coupling the hardware 414-1 and the BMC 412-1 on the SB #1, to the switch control unit 431-1 (procedure 1703).

In this case, both the control signals (G1, G2) and (G3, G4) are set to (0, 0) and are output as HW information control signals. The setting unit 702 of the switch control unit 431-1 switches an output-side HW information switch unit 433-1 and an input-side HW information switch unit 432-1, according to the received control signals (G1, G2) and (G3, G4). Thus, as illustrated in FIG. 13, the hardware 414-1 and the BMC 412-1 are coupled.

Next, the HW information switch processing unit 601 of the BMC 412-1 outputs a HW information control signal for coupling the hardware 414-0 on the SB #0 and the BMC 412-1 on the SB #1, to the switch control unit 431-1 (procedure 1704).

In this case, the control signals (G1, G2) are set to (1, 1) and are output as HW information control signals. The setting unit 702 of the switch control unit 431-1 switches the output-side HW information switch unit 433-1, according to the received control signals (G1, G2). Thus, the BMC 412-0 is coupled to the HW information signal line between the input-side HW information switch unit 432-0 and the output-side HW information switch unit 433-1.

Next, the HW information switch processing unit 502 of the MMB 411 transmits a HW information control signal for coupling the hardware 414-0 on the SB #0 and the BMC 412-1 on the SB #1, to the switch control unit 431-0 (procedure 1705).

In this case, the control signals (G3, G4) are set to (1, 1) and transmitted as the HW information control signal. The setting unit 702 of the switch control unit 431-0 switches the input-side HW information switch unit 432-0, according to the received control signals (G3, G4). Accordingly, as illustrated in FIG. 14, the hardware 414-0 is coupled to the HW information signal line between the input-side HW information switch unit 432-0 and the output-side HW information switch unit 433-1. Therefore, the hardware 414-0 and the BMC 412-1 are coupled through the HW information signal line.

Figure 20:
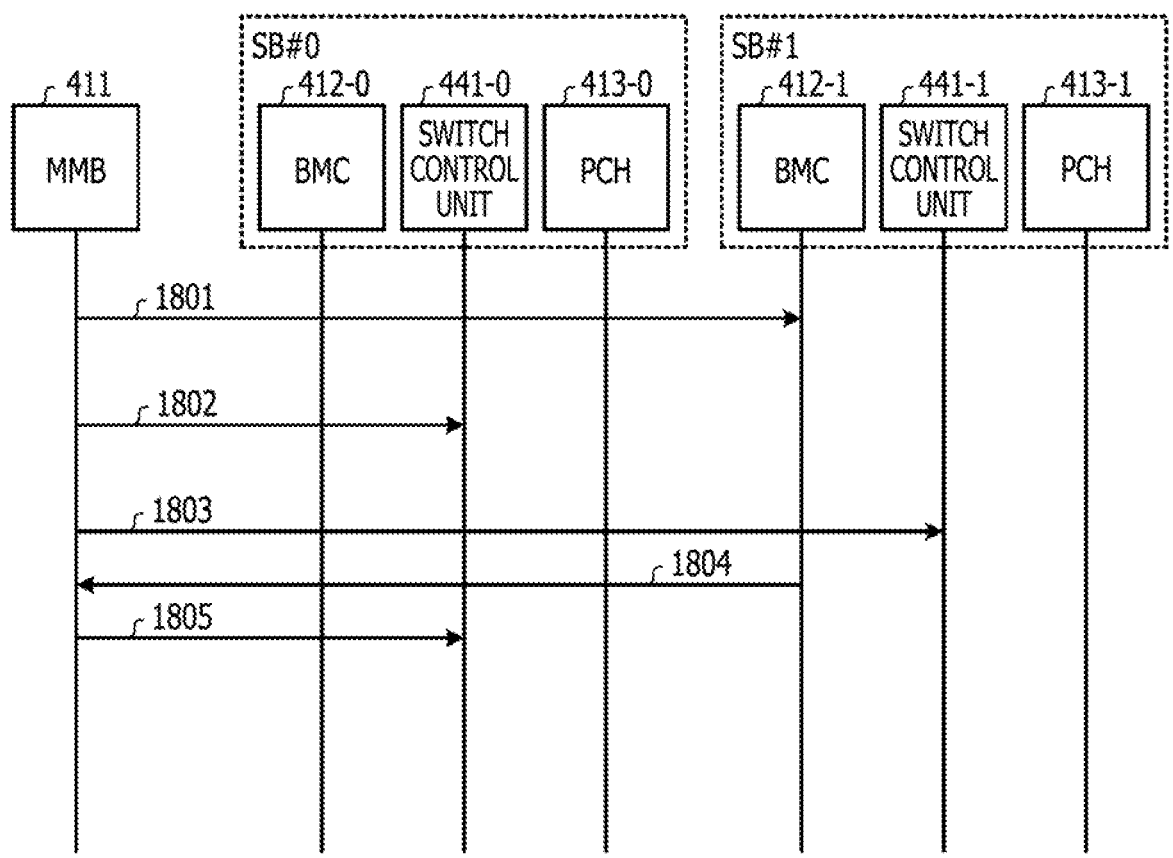
FIG. 20 is a diagram illustrating a sequence of a switch control process performed by a PCH switch processing unit of the MMB.

FIG. 20 illustrates an example of a sequence of switch control process to be performed by the PCH switch processing unit 503 of the MMB 411 when a Home BMC fails. A procedure 1801 represents the same processing as the procedure 1701 in FIG. 19.

Next, the PCH switch processing unit 503 of the MMB 411 transmits a PCH control signal for decoupling the coupling between the PCH 413-0 and the BMC 412-0 on the SB #0, to a switch control unit 441-0 (procedure 1802).

In this case, the control signals (G1, G2) are set to (0, 1), (1, 0), or (1, 1) and transmitted as a PCH control signal. The setting unit 1002 of the switch control unit 441-0 decouples the coupling between the PCH 413-0 and the BMC 412-0 by switching the output-side PCH switch unit 443-0 according to the received control signals (G1, G2).

Then, the PCH switch processing unit 503 of the MMB 411 transmits a PCH control signal for decoupling the coupling between the PCH 413-1 and the BMC 412-1 on the SB #1, to the switch control unit 441-1 (procedure 1803).

In this case, the control signals (G1, G2) are set to (1, 1) and transmitted as the PCH control signal. The setting unit 1002 of the switch control unit 441-1 switches the output-side PCH switch unit 443-1, according to the received control signals (G1, G2). Thus, the coupling between the PCH 413-1 and the BMC 412-1 is decoupled, and the BMC 412-1 is coupled to the PCH signal line between the input-side PCH switch unit 442-0 and the output-side PCH switch unit 443-1.

Next, the BMC 412-1 notifies the MMB 411 that it may be coupled to the PCH 413-0 on SB #0 (procedure 1804).

Since the BMC 412-1 recognizes only a single PCH, there is a possibility of malfunction if two PCHs are coupled at the same time. Therefore, the BMC 412-1 notifies the MMB 411 that the PCH 413-0 may be coupled, after the coupling between the PCH 413-1 and the BMC 412-1 is decoupled by the MMB 411. Thus, simultaneous coupling of the PCH 413-0 and the PCH 413-1 to BMC 412-1 is avoided, and malfunction of the BMC 412-1 may be suppressed.

Next, the PCH switch processing unit 503 of the MMB 411 transmits a PCH control signal for coupling the PCH 413-0 on SB #0 and the BMC 412-1 on SB #1, to the switch control unit 441-0 (procedure 1805).

In this case, the control signals (G3, G4) are set to (1, 1) and transmitted as the PCH control signal. The setting unit 1002 of the switch control unit 441-0 switches the input-side PCH switch unit 432-0, according to the received control signals (G3, G4). Thus, as illustrated in FIG. 16, the PCH 413-0 is coupled to the PCH signal line between the input-side PCH switch unit 442-0 and the output-side PCH switch unit 443-1, and the PCH 413-0 and the BMC 412-1 are coupled through the PCH signal line.

In the OS operating on the CPU 421-0, the coupling between the PCH 413-0 and the BMC 412-0 is decoupled, so it seems that the coupling with other devices coupled to the BMC 412-0 is also decoupled. However, when the PCH 413-0 and the BMC 412-1 are coupled, it appears that the other devices are recoupled, so the OS may continue processing without performing any special control.

Next, the processing when the Home BMC fails during communication will be supplemented. In a steady state, the Home BMC often communicates at regular intervals, such as a case of acquiring sensor data from the hardware 414-i. Since such communication is performed regularly regardless of success or failure, a communication failure is allowed when the failure of the Home BMC and the communication timing overlap. However, since the communication performed after Home BMC switching is successful, the impact on server management is minimized.

On the other hand, there is one-time communication such as SEL issue request communication. When such communication fails, a retry is performed, but when the Home BMC fails, the retry times out and communication processing is not performed correctly. Therefore, communication processing fails, immediately before the Home BMC failure occurs and after the Home BMC is switched.

For example, regarding SEL issue request communication between the Home BMC and the non-Home BMC, it is considered to perform parallel processing for each BMC communication so as not to affect other processing by adding a retry time considering the switching of the Home BMC. Thereby, it is possible to make communication successful. However, regarding the SEL issue request communication from the OS or BIOS to the Home BMC, the failed Home BMC may not recognize the communication.

Figure 21:
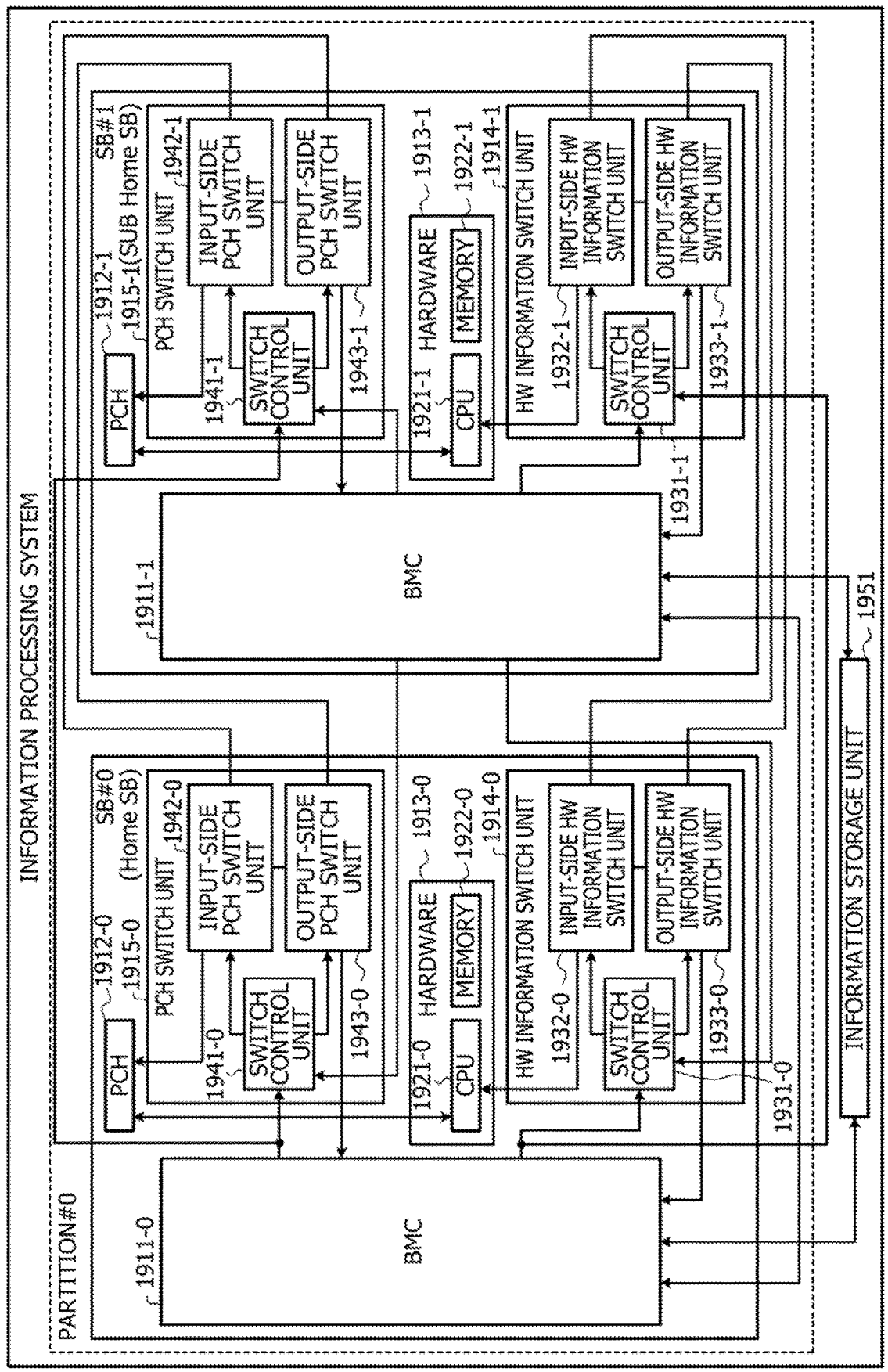
FIG. 21 is a configuration diagram illustrating a second specific example of the information processing system.

FIG. 21 illustrates a second specific example of the information processing system 301 in FIG. 3. The information processing system 1901 in FIG. 21 includes partition #0 and an information storage unit 1951, and the partition #0 includes SB #0 and SB #1. SB #0 is the Home SB of partition #0, and SB #1 is a SubHome SB.

The SB #i (i=0, 1) includes a BMC 1911-i, a PCH 1912-i, hardware 1913-i, a HW information switch unit 1914-i, and a PCH switch unit 1915-i. The hardware 1913-i includes a CPU 1921-i and a memory 1922-i. The hardware 1913-i may include other hardware devices. The BMC 1911-i manages and monitors the hardware 1913-i.

Each of SB #0 and SB #1 corresponds to the information processing apparatus 311-i in FIG. 3. The partition #0 may include three or more SBs. In this case, each SB has the same configuration as SB #0 and SB #1.

The BMC 412-0 and the BMC 412-1 may access the information storage unit 1951, through a private LAN, and the BMC 412-0 may communicate with the BMC 412-1 through a private LAN. The information storage unit 1951 includes a nonvolatile storage area.

When a partition is created by the user and the Home SB is set, the information processing system 1901 may set the SubHome SB in the same way as the information processing system 401 in FIG. 4.

The PCH 1912-$i$ manages communication between the CPU 1921-$i$ and the peripheral IO device. The PCH 1912-$i$ is an example of a communication management unit.

The HW information switch unit 1914-$i$ includes a switch control unit 1931-$i$, an input-side HW information switch unit 1932-$i$, and an output-side HW information switch unit 1933-$i$. The input-side HW information switch unit 1932-$i$ is coupled to the hardware 1913-$i$ and the output-side HW information switch units 1933-0 and 1933-1 by HW information signal lines. In a case where the information processing system 1901 includes three or more SBs, the input-side HW information switch unit 1932-$i$ is coupled to the output-side HW information switch unit 1933-$i$ on all SBs.

The output-side HW information switch unit 1933-$i$ is coupled to the BMC 1911-$i$ and the input-side HW information switch units 1932-0 and 1932-1 by HW information signal lines. In a case where the information processing system 1901 includes three or more SBs, the output-side HW information switch unit 1933-$i$ is coupled to the input-side HW information switch unit 1932-$i$ on all SBs.

The switch control unit 1931-$i$ changes the coupling of the HW information signal lines by switching the input-side HW information switch unit 1932-$i$ and the output-side HW information switch unit 1933-$i$.

The BMC 1911-$i$ is coupled to the switch control units 1931-0 and 1931-1 by signal lines of GPIO or the like. In a case where the information processing system 1901 includes three or more SBs, the BMC 1911-$i$ is coupled to the switch control units 1931-$i$ on all SBs.

The BMC 1911-$i$ may switch the input-side HW information switch unit 1932-$i$ and the output-side HW information switch unit 1933-$i$ through the switch control unit 1931-$i$ on each SB. Thus, the BMC 1911-$i$ may access any hardware 1913-$i$ on the SB #0 or SB #1.

The PCH switch unit 1915-$i$ includes a switch control unit 1941-$i$, an input-side PCH switch unit 1942-$i$, and an output-side PCH switch unit 1943-$i$. The PCH switch unit 1915-$i$, the input-side PCH switch unit 1942-$i$, and the output-side PCH switch unit 1943-$i$ are examples of the processor communication switch unit, the input-side processor communication switch unit, and the output-side processor communication switch unit.

The input-side PCH switch unit 1942-$i$ is coupled to the PCH 1912-$i$, and the output-side PCH switch units 1943-0 and 1943-1 by the PCH signal lines. In a case where the information processing system 1901 includes three or more SBs, the input-side PCH switch unit 1942-$i$ is coupled to the output-side PCH switch unit 1943-$i$ on all SBs.

The output-side PCH switch unit 1943-$i$ is coupled to the BMC 1911-$i$, and the input-side PCH switch units 1942-0 and 1942-1 by the PCH signal lines. In a case where the information processing system 1901 includes three or more SBs, the output-side PCH switch unit 1943-$i$ is coupled to the input-side PCH switch unit 1942-$i$ on all SBs. A PCH signal line is an example of a processor communication signal line.

The switch control unit 1941-$i$ changes the coupling of the PCH signal lines by switching the input-side PCH switch unit 1942-$i$ and the output-side PCH switch unit 1943-$i$.

The BMC 1911-$i$ is coupled to the switch control units 1941-0 and 1941-1 by signal lines of GPIO. In a case where the information processing system 1901 includes three or more SBs, the BMC 1911-$i$ is coupled to the switch control units 1941-$i$ on all SBs.

The BMC 1911-$i$ may switch the input-side PCH switch unit 1942-$i$ and the output-side PCH switch unit 1943-$i$ through the switch control unit 1941-$i$ on each SB. Thus, the BMC 1911-$i$ may access any PCH 1912-$i$ on the SB #0 or SB #1.

Figure 22:
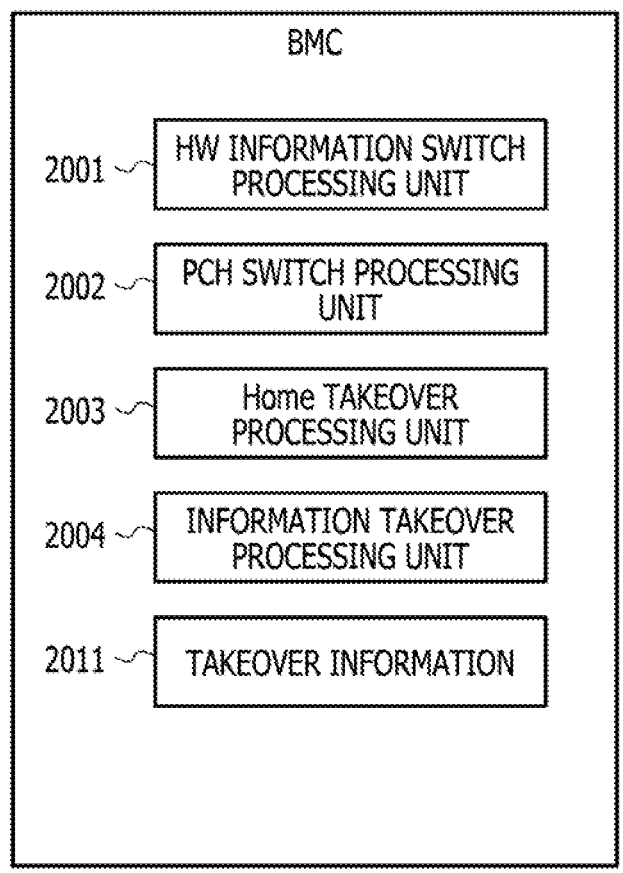
FIG. 22 is a functional configuration diagram of a BMC of the second specific example.

FIG. 22 illustrates a functional configuration example of the BMC 1911-$i$ of FIG. 21. BMC 1911-$i$ in FIG. 22 includes a HW information switch processing unit 2001, a PCH switch processing unit 2002, a Home takeover processing unit 2003, and an information takeover processing unit 2004, and holds takeover information 2011.

The takeover information 2011 corresponds to the takeover information 611 in FIG. 6, and includes error monitoring information, SEL information, NVRAM information, BMC internal variables, BIOS information, LPC setting information, and KCS setting information.

The BMC 1911-0 on the Home SB synchronizes the takeover information 2011 with the BMC 1911-1 on the SubHome SB or transmits a copy of the takeover information 2011 to the information storage unit 1951 for backup. When the BMC 1911-0 fails, the BMC 1911-1 which is a new Home BMC uses synchronized takeover information 2011 or acquires takeover information 2011 from the information storage unit 1951 to take over the role of the Home BMC.

When any information included in the takeover information 2011 of the Home BMC is updated, the takeover information 2011 of the BMC 1911-1 or the information storage unit 1951 is updated synchronously. For example, when new sensor data is acquired, the sensor data are immediately transmitted to the BMC 1911-1 or the information storage unit 1951. When the BMC internal variable of the BMC 1911-0 is changed, the BMC internal variable is immediately transmitted to the BMC 1911-1 or the information storage unit 1951. Thus, the BMC 1911-1 may acquire the information updated over the Home SB without leakage.

The HW information switch processing unit 2001 outputs a HW information control signal to a HW information switch unit 1914-$i$. The HW information switch unit 1914-$i$ performs a control to switch the input-side HW information switch unit 1932-$i$ and the output-side HW information switch unit 1933-$i$, according to the received HW information control signal.

When the partition is constructed, the input-side HW information switch unit 1932-$i$ and the output-side HW information switch unit 1933-$i$ are switched such that the hardware 1913-$i$ on each SB and the BMC 1911-0 on the Home SB are coupled. The BMC 1911-0 obtains sensor data output from the hardware 1913-0 and the hardware 1913-1.

The PCH switch processing unit 2002 transmits a PCH control signal to a PCH switch unit 1915-$i$ on each SB. The PCH switch unit 1915-$i$ performs control to switch the input-side PCH switch unit 1942-$i$ and the output-side PCH switch unit 1943-$i$, according to the received PCH control signal.

When the partition is constructed, the input-side PCH switch unit 1942-$i$ and the output-side PCH switch unit 1943-$i$ are switched such that the PCH 1912-$i$ and the BMC 1911-$i$ on the same SB are coupled. The BMC 1911-0 communicates with the OS operating on the CPU 1921-0 through the PCH 1912-0.

The Home takeover processing unit 2003 of the BMC 1911-1 checks whether or not the BMC 1911-0 is operating normally, and switches the Home BMC from the BMC 1911-0 to the BMC 1911-1, in a case of detecting a failure of the BMC 1911-0. The Home takeover processing unit 2003 notifies the BMC 1911-$i$ on the other SB that the Home BMC is switched.

When the takeover information 2011 is synchronized between the BMC 1911-0 and the BMC 1911-1, the information takeover processing unit 2004 of the BMC 1911-1 takes over information from the BMC 1911-0 by using the takeover information 2011 in the BMC 1911-1. On the other hand, when the takeover information 2011 is backed up in the information storage unit 1951, the information takeover processing unit 2004 of the BMC 1911-1 acquires the takeover information 2011 from the information storage unit 1951 and stores it in the memory in the BMC 1911-1.

Next, the information takeover processing unit 2004 stores error monitoring information, SEL information, and NVRAM information among the takeover information 2011 in the NVRAM, and stores the LPC setting information and the KCS setting information in a register of the CPU in the BMC 1911-1.

Next, the HW information switch processing unit 2001 of the BMC 1911-1 transmits a HW information control signal to a HW information switch unit 1914-0 on the Home SB. The HW information switch unit 1914-0 performs a control to couple the hardware 1913-0 to a HW information signal line between the input-side HW information switch unit 1932-0 and the output-side HW information switch unit 1933-1, according to the received HW information control signal.

Next, the HW information switch processing unit 2001 outputs a HW information control signal to a HW information switch unit 1914-1. The HW information switch unit 1914-1 performs a control to couple the BMC 1911-1 to a HW information signal line between the input-side HW information switch unit 1932-0 and the output-side HW information switch unit 1933-1, according to the received HW information control signal. The BMC 1911-1 obtains sensor data output from the hardware 1913-0, through the HW information signal line.

On the other hand, a PCH switch processing unit 2002 of the BMC 1911-1 outputs a PCH control signal to a PCH switch unit 1915-$i$ on each SB. The PCH switch unit 1915-0 performs a control to couple the PCH 1912-0 to a PCH signal line between the input-side PCH switch unit 1942-0 and the output-side PCH switch unit 1943-1, according to the received PCH control signal. The PCH switch unit 1915-1 performs a control to couple the BMC 1911-1 to the same PCH signal line, according to the received PCH control signal. The BMC 1911-1 communicates with the OS operating on the CPU 1921-0 through the PCH 1912-0 coupled to the PCH signal line.

According to the information processing system 1901 in FIG. 21, the BMC 1911-$i$ on each SB may directly control the HW information switch unit 1914-$i$ on all SBs. Therefore, in a case of detecting a failure of the Home BMC, the BMC 1911-1 may switch the Home BMC from BMC 1911-0 to BMC 1911-1, and forcibly couple the hardware 1913-0 on the Home SB to the BMC 1911-1. Thus, the BMC 1911-1 may directly acquire the sensor data from the hardware 1913-0.

The BMC 1911-$i$ on each SB may also directly control the PCH switch unit 1915-$i$ on all SBs. Therefore, in a case where the Home BMC is switched from BMC 1911-0 to BMC 1911-1, the BMC 1911-1 may forcibly couple the PCH 1912-0 on the Home SB to the BMC 1911-1. Thus, the BMC 1911-1 may provide a service involving communication with the OS, while communicating with the OS operating on the CPU 1921-0 through the PCH 1912-0.

By synchronizing the takeover information between the Home BMC and the SubHome BMC, in a case where the Home BMC fails, the new Home BMC may take over the information managed by the failed Home BMC.

Thus, when the BMC on the Home SB fails, another BMC in the same partition may automatically take over the role of the Home BMC without stopping the information processing system 1901.

Since the information processing system 1901 does not include the MMB, the hardware cost of the entire system is reduced as compared with the information processing system 401 illustrated in FIG. 4. Meanwhile, the software development cost of the BMC is increased more than that of the information processing system 401.

Next, a specific example in a case where the information processing system 1901 in FIG. 21 includes SB #0 to SB #3 will be described with reference to FIGS. 23 and 24.

Figure 23:
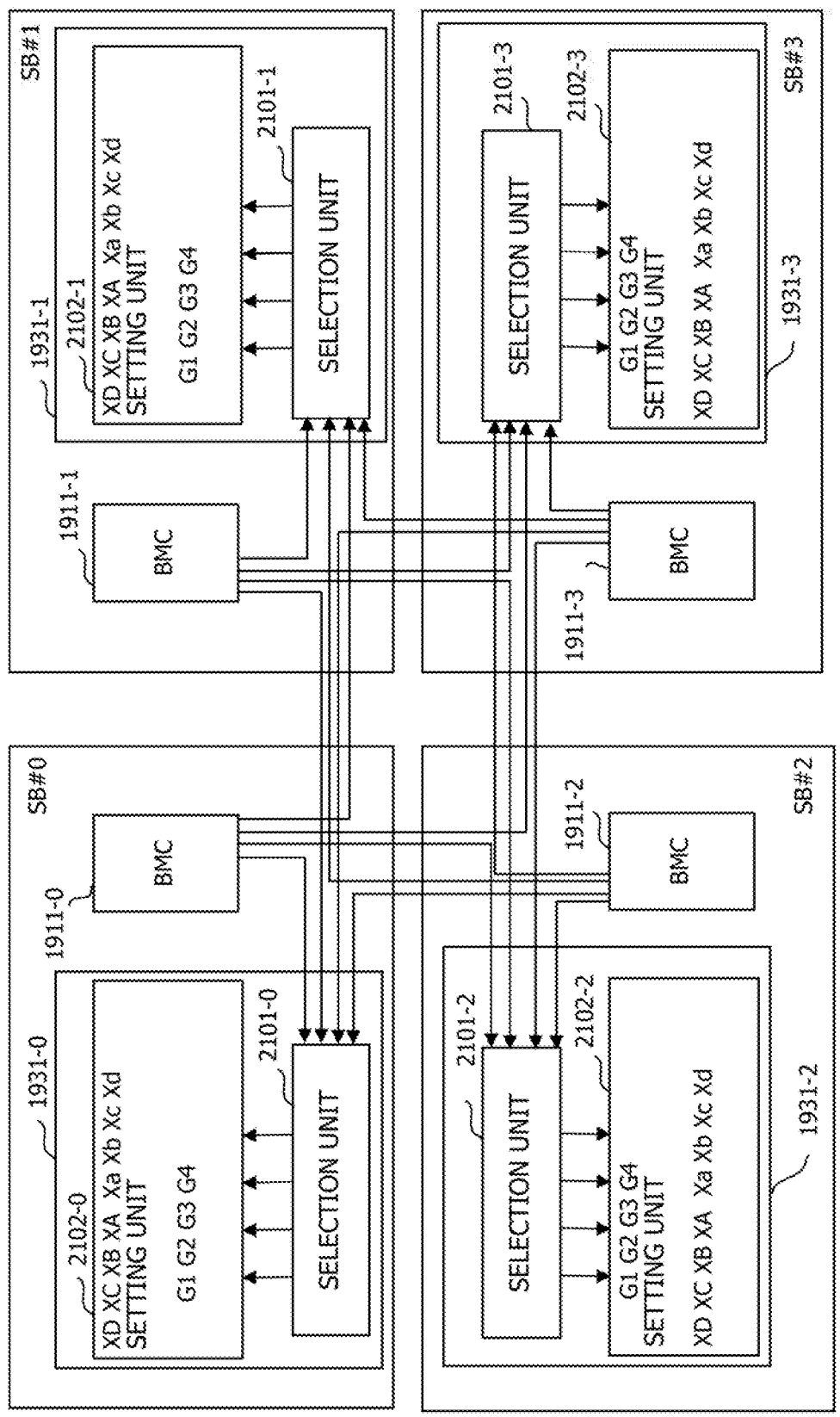
FIG. 23 is a configuration diagram of a HW information switch unit of the second specific example.

FIG. 23 illustrates a configuration example of the HW information switch unit 1914-$i$ in FIG. 21. The switch control unit 1931-$i$ includes a selection unit 2101-$i$ and a setting unit 2102-$i$. The input-side HW information switch unit 1932-$i$ and the output-side HW information switch units 1933-$i$ have the same configurations as the input-side HW information switch unit 432-$i$ and the output-side HW information switch units 433-$i$ in FIG. 7.

The BMC 1911-$i$ outputs control signals G1 to G4 for switching the input-side HW information switch unit 1932-$i$ and the output-side HW information switch unit 1933-$i$, to the switch control units 1931-0 to 1931-3. The selection unit 2101-$i$ of each switch control unit 1931-$i$ selects the control signals G1 to G4 of the BMC 412-$i$, according to the selection signal from any BMC 1911-$i$, and outputs the selected control signal to the setting unit 2102-$i$. The correspondence relationship between the control signals G1 to G4 and the coupling destination port is the same as in FIGS. 9A and 9B.

Control signals G1 to G4 output to the setting unit 2102-$i$ are examples of HW information control signals. Among the control signals, the control signals G1 and G2 are control signals for switching the output-side HW information switch units 1933-$i$, and the control signals G3 and G4 are control signals for switching the input-side HW information switch units 1932-$i$.

The setting unit 2102-$i$ outputs control signals XA to XD to the output-side HW information switch unit 1933-$i$, based on the control signals G1 and G2. The setting unit 2102-$i$ outputs control signals Xa to Xd to the input-side HW information switch unit 1932-$i$, based on the control signals G3 and G4.

Figure 24:
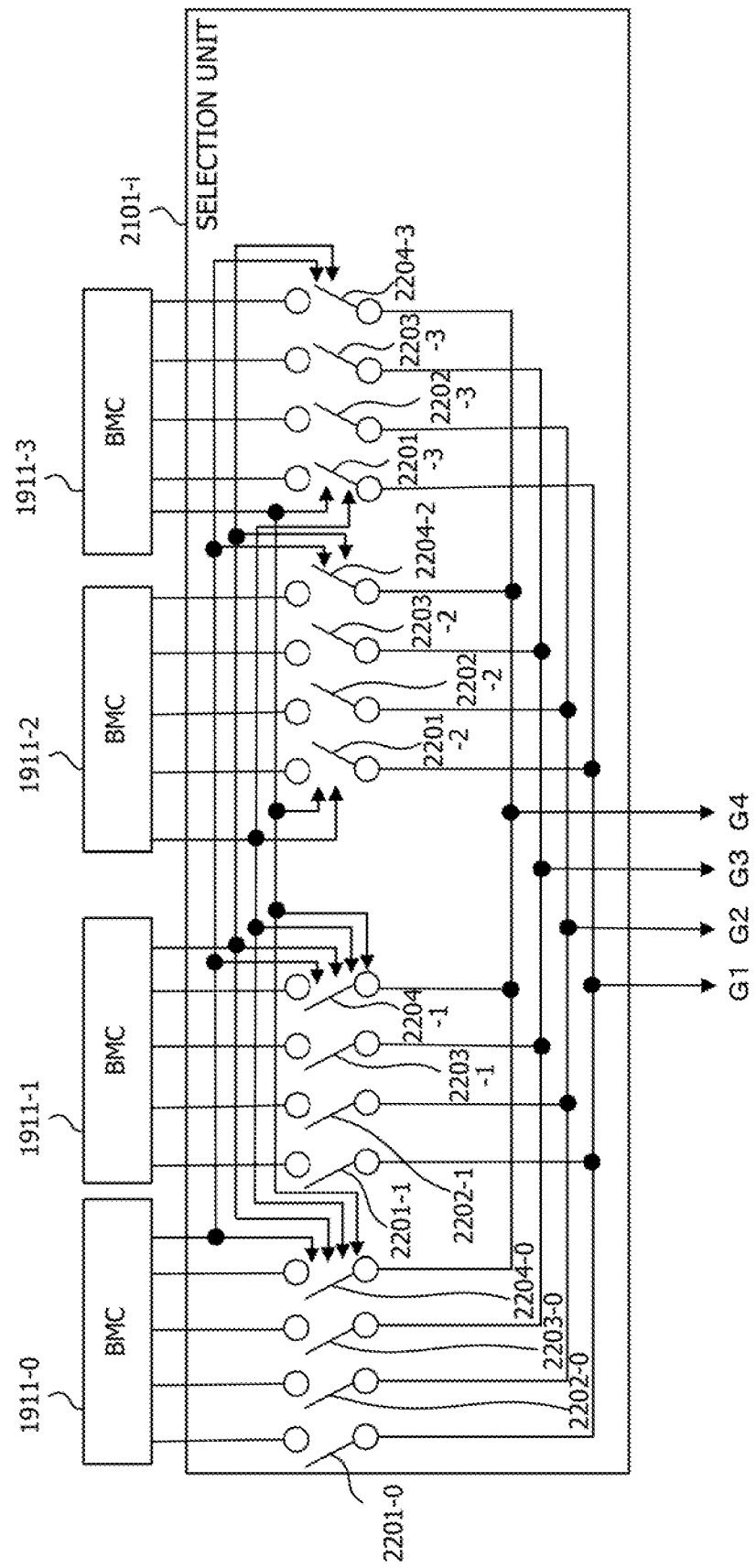
FIG. 24 is a configuration diagram of a selection unit of the second specific example.

FIG. 24 illustrates a configuration example of the selection unit 2101-$i$ of FIG. 23. The selection unit 2101-$i$ includes a switch 2201-0 to switch 2204-0, switch 2201-1 to switch 2204-1, switch 2201-2 to switch 2204-2, and switch 2201-3 to switch 2204-3. The switches 2201-$i$ to 2204-$i$ ($i$=0 to 3) are set to ON or OFF by a selection signal transmitted from any BMC 1911-$i$.

In a case where the switches 2201-0 to 2204-0 are set to ON and all other switches are set to OFF, the control signals G1 to G4 from the BMC 1911-0 are output to the setting unit 2102-$i$. In a case where the switches 2201-1 to 2204-1 are set to ON and all other switches are set to OFF, the control signals G1 to G4 from the BMC 1911-1 are output to the setting unit 2102-$i$.

In a case where the switches 2201-2 to 2204-2 are set to ON and all other switches are set to OFF, the control signals G1 to G4 from the BMC 1911-2 are output to the setting unit 2102-*i*. In a case where the switches 2201-3 to 2204-3 are set to ON and all other switches are set to OFF, the control signals G1 to G4 from the BMC 1911-3 are output to the setting unit 2102-*i*.

When any BMC 1911-*k* controls the HW information switch unit 1914-*i*, the BMC 1911-*k* transmits a command for checking the propriety of switch control, to all BMCs in the same partition. When a response indicating that switch control is possible is received from the BMCs, the BMC 1911-*k* starts control of the HW information switch unit 1914-*i*.

When there is a BMC 1911-*m* that does not transmit a response, the BMC 1911-*k* checks whether or not a survival checking command has been received from the BMC 1911-*m*. When the command is received, the BMC 1911-*k* transmits again a command for checking the propriety of switch control. When the survival checking command has not been received, the BMC 1911-*k* ignores the BMC 1911-*m* and starts control of the HW information switch unit 1914-*i*.

When the BMC 1911-*k* is controlling the HW information switch unit 1914-*i* and receives a command for checking the propriety of switch control, from another BMC 1911-*m*, the BMC 1911-*k* returns a response indicating that the switch control is disabled to the BMC 1911-*m*.

According to the configurations of FIGS. 23 and 24, all the BMCs transmit the selection signal to the selection unit 2101-*i* of each switch control unit 1931-*i*, so the control signals G1 to G4 may be output to the setting unit 2102-*i*.

The configuration of the PCH switch unit 1915-*i* in FIG. 21 is the same as that in FIGS. 23 and 24. In the information processing system 1901 in FIG. 21, the switch control when the BMC on the Home SB or SubHome SB accesses the hardware is the same as in FIGS. 11 to 14. The switch control when the BMC on the Home SB or SubHome SB accesses the PCH is the same as in FIGS. 15 and 16.

Figure 25:
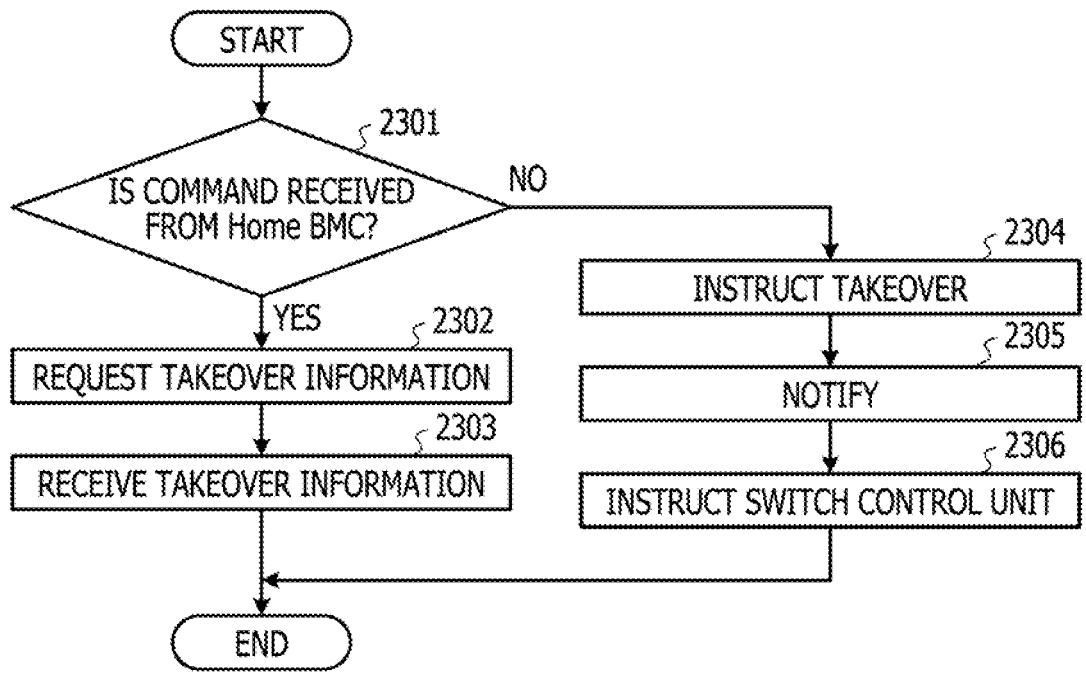
FIG. 25 is a flowchart illustrating a Home takeover process of the second specific example.

FIG. 25 is a flowchart illustrating an example of Home takeover process performed by the BMC on the SubHome SB. First, the BMC on each SB transmits a survival checking command to the BMC on another SB at regular intervals, and the Home takeover processing unit 2003 of the BMC on SubHome SB checks whether a command is received from the Home BMC (step 2301).

When a command is received from the Home BMC (step 2301, YES), the Home takeover processing unit 2003 determines that the Home BMC is operating normally, and requests the takeover information 2011 from the Home BMC (step 2302). The Home takeover processing unit 2003 receives the takeover information 2011 from the Home BMC, and stores the received takeover information 2011 (step 2303).

On the other hand, when the command from the Home BMC is interrupted (step 2301, NO), the Home takeover processing unit 2003 determines that the Home BMC has failed, and designates the BMC on the SubHome SB as a new Home BMC. The Home takeover processing unit 2003 instructs the information takeover processing unit 2004 to start the takeover process (step 2304).

Next, the Home takeover processing unit 2003 notifies the BMC on the other SB in the partition of the identification information of the SubHome SB as the identification information of the SB including the Home BMC (step 2305).

Next, the Home takeover processing unit 2003 instructs the HW information switch processing unit 2001 and the PCH switch processing unit 2002 to start switch control (step 2306).

The information takeover processing unit 2004 instructed by the Home takeover processing unit 2003 to start the takeover process performs the same information takeover process as in FIG. 18.

When the takeover information 2011 is backed up in the information storage unit 1951, the processing of Step 2302 and Step 2303 in FIG. 25 may be omitted. In this case, the information takeover processing unit 2004 acquires the takeover information 2011 from the information storage unit 1951, and performs the information takeover process similar to that in FIG. 18.

Figure 26:
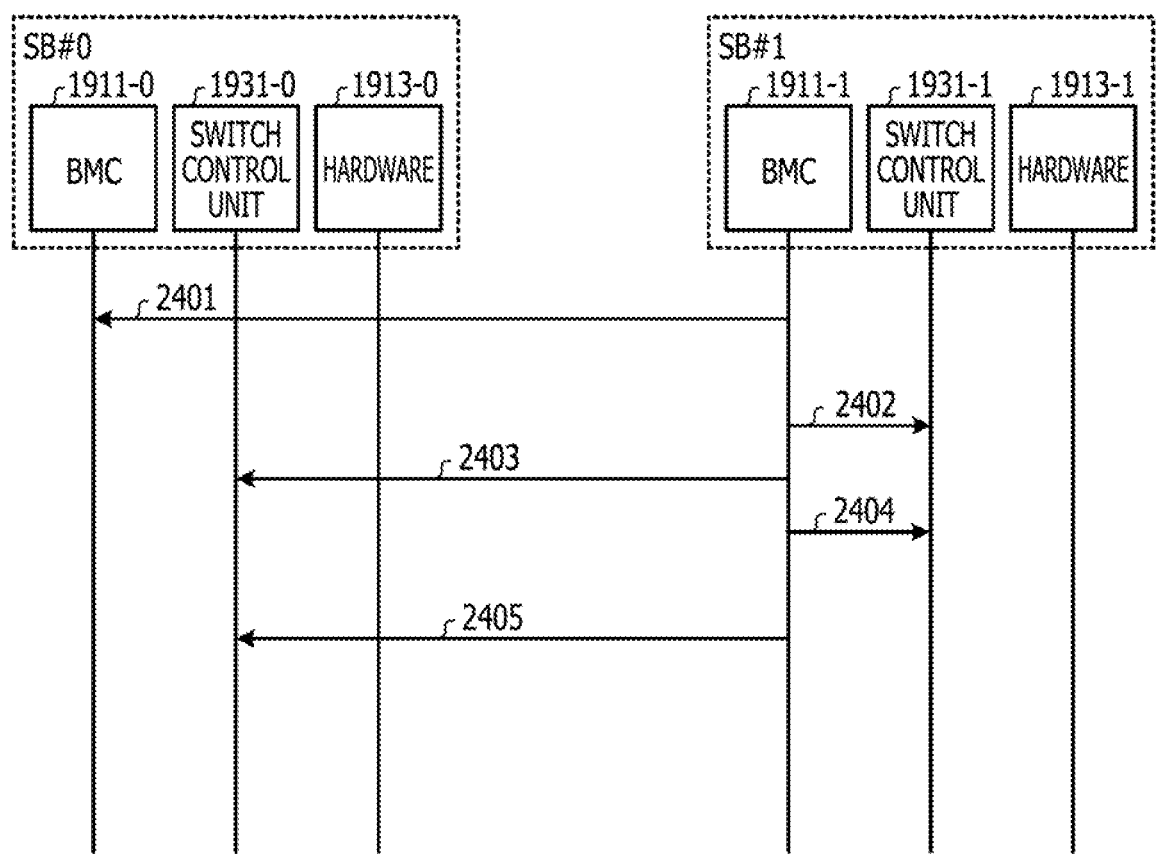
FIG. 26 is a diagram illustrating a sequence of a switch control process performed by a HW information switch processing unit of the BMC.

FIG. 26 illustrates an example of a sequence of switch control process performed by the HW information switch processing unit 2001 of the BMC 1911-1 on the SubHome SB when the Home BMC fails. First, the Home takeover processing unit 2003 of the BMC 1911-1 detects a failure of the BMC 412-0 which is the Home BMC, and switches the Home BMC from the BMC 412-0 to the BMC 412-1 (procedure 2401).

Next, the HW information switch processing unit 2001 of the BMC 1911-1 transmits a selection signal for selecting the control signals G1 to G4 of the BMC 1911-1, to the switch control unit 1931-1. The selection unit 2101-1 of the switch control unit 1931-1 sets the switches 2201-1 to 2204-1 to ON and sets all the other switches to OFF, according to the selection signal.

Next, the HW information switch processing unit 2001 of the BMC 1911-1 outputs a HW information control signal for coupling the hardware 1913-1 and the BMC 1911-1 on the SB #1, to the switch control unit 1931-1 (procedure 2402). Thus, the hardware 1913-1 and the BMC 1911-1 are coupled.

Next, the HW information switch processing unit 2001 of the BMC 1911-1 transmits a selection signal for selecting the control signals G1 to G4 of the BMC 1911-1, to the switch control unit 1931-0. The selection unit 2101-0 of the switch control unit 1931-0 sets the switches 2201-1 to 2204-1 to ON and sets all the other switches to OFF, according to the selection signal.

Next, the HW information switch processing unit 2001 of the BMC 1911-1 transmits a HW information control signal for decoupling the coupling between the hardware 1913-0 and the BMC 1911-0 on the SB #0, to the switch control unit 1931-0 (procedure 2403). Thus, the coupling between the hardware 1913-0 and the BMC 1911-0 is decoupled.

Next, the HW information switch processing unit 2001 of the BMC 1911-1 outputs a HW information control signal for coupling the hardware 1913-0 on the SB #0 and the BMC 1911-1 on the SB #1, to the switch control unit 1931-1 (procedure 2404). Thus, the BMC 1911-1 is coupled to the HW information signal line between the input-side HW information switch unit 1932-0 and the output-side HW information switch unit 1933-1.

Next, the HW information switch processing unit 2001 of the BMC 1911-1 outputs a HW information control signal for coupling the hardware 1913-0 on the SB #0 and the BMC 1911-1 on the SB #1, to the switch control unit 1931-0 (procedure 2405). Thus, the hardware 1913-0 is coupled to the HW information signal line between the input-side HW information switch unit 1932-0 and the output-side HW information switch unit 1933-1. Therefore, the hardware 1913-0 and the BMC 1911-1 are coupled through the HW information signal line.

Figure 27:
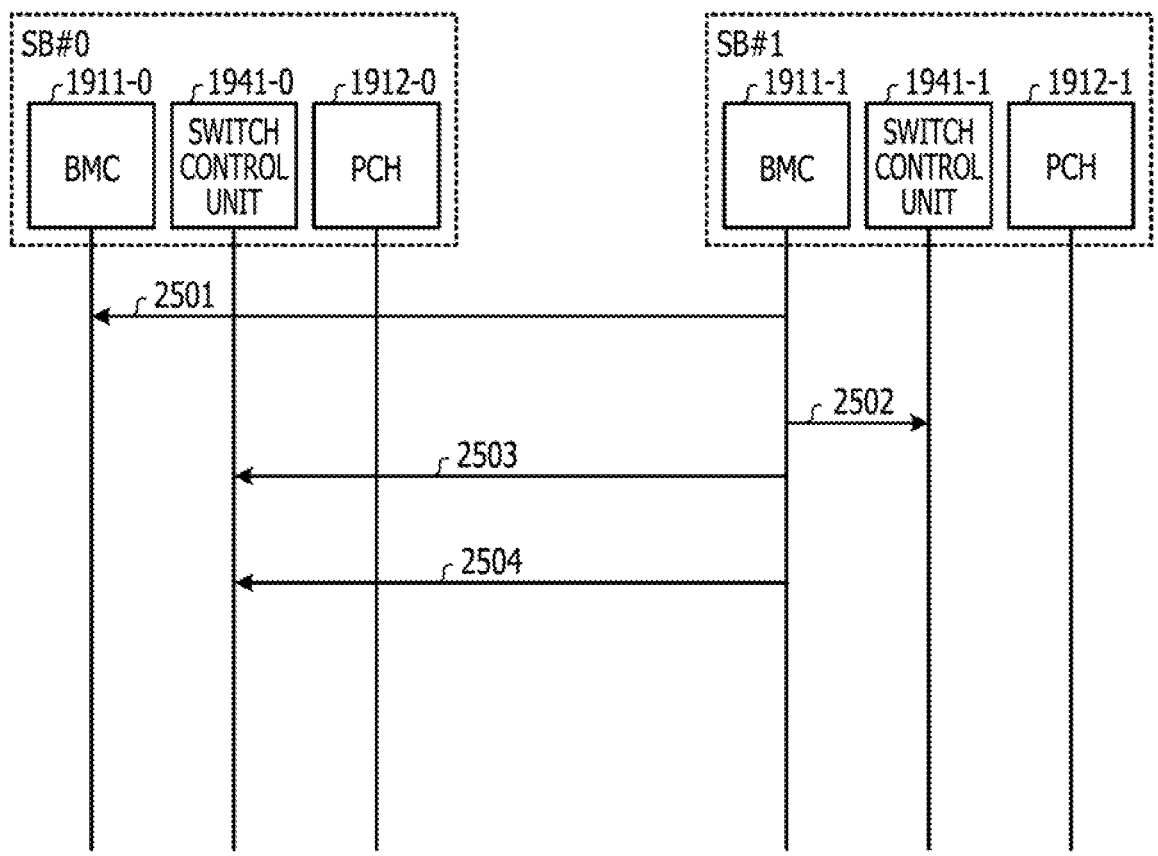
FIG. 27 is a diagram illustrating a sequence of a switch control process performed by a PCH switch processing unit of the BMC.

FIG. 27 illustrates an example of a sequence of switch control process performed by the PCH switch processing unit 2002 of the BMC 1911-1 on a SubHome SB when the Home BMC fails. A procedure 2501 represents the same processing as the procedure 2401 in FIG. 26.

Next, the PCH switch processing unit 2002 of the BMC 1911-1 outputs a PCH control signal for decoupling coupling between the PCH 1912-1 and the BMC 1911-1 on the SB #1, to a switch control unit 1941-1 (procedure 2502). Thus, the coupling between the PCH 1912-1 and the BMC 1911-1 is decoupled, and the BMC 1911-1 is coupled to the PCH signal line between the input-side PCH switch unit 1942-0 and the output-side PCH switch unit 1943-1.

Next, the PCH switch processing unit 2002 of the BMC 1911-1 transmits a PCH control signal for decoupling coupling between the PCH 1912-0 and the BMC 1911-0 on the SB #0, to the switch control unit 1941-0 (procedure 2503). Thus, the coupling between the PCH 1912-0 and the BMC 1911-0 is decoupled.

Next, the PCH switch processing unit 2002 of the BMC 1911-1 transmits a PCH control signal for coupling the PCH 1912-0 on SB #0 and the BMC 1911-1 on SB #1, to the switch control unit 1941-0 (procedure 2504). Thus, the PCH 1912-0 is coupled to the PCH signal line between the input-side PCH switch unit 1942-0 and the output-side PCH switch unit 1943-1, and the PCH 1912-0 and the BMC 1911-1 are coupled through the PCH signal line.

The configuration of the information processing system in FIGS. 1 to 4 and 21 is illustrative only, and some constituent elements may be omitted or changed in accordance with usage or conditions of the information processing system. For example, the number of SBs is not limited to two or four, and any number of SBs may be included in each information processing system. The number of partitions is not limited to one or two, and any number of partitions may be included in each information processing system. The number of SBs that belong to one partition may be three or more.

Hardware devices other than the CPU and the memory may be mounted over each SB. The sensor data output from hardware devices may not be limited to the state, voltage, and temperature of the hardware devices but include identification information on the SB.

In an information processing system 1901 illustrated in FIG. 21, an information storage unit 1951 may be omitted, in a case where the takeover information 2011 is synchronized between the BMC 1911-0 on the Home SB and the BMC 1911-1 on the SubHome SB.

The configuration of the MMB 411 in FIG. 5 is illustrative only, and some components may be omitted or changed according to the configuration or conditions of the information processing system. The configuration of the BMC in FIGS. 6 and 22 is illustrative only, and some components may be omitted or changed according to the configuration or conditions of the information processing system.

The configurations of the switch control unit 431-$i$, the input-side HW information switch unit 432-$i$, and the output-side HW information switch unit 433-$i$ in FIG. 7 are illustrative only, and some components may be omitted or changed according to the configuration or conditions of the information processing system. The number of ports of the input-side HW information switch unit 432-$i$, and the output-side HW information switch unit 433-$i$ is changed according to the number of SBs in the information processing system.

The configuration of the selection unit 701 in FIG. 8 is illustrative only, and some components may be omitted or changed according to the configuration or conditions of the information processing system.

The configurations of the switch control unit 441-$i$, the input-side PCH switch unit 442-$i$, and the output-side PCH switch unit 443-$i$ in FIG. 10 are illustrative only, and some components may be omitted or changed according to the configuration or conditions of the information processing system. The number of ports of the input-side PCH switch unit 442-$i$, and the output-side PCH switch unit 443-$i$ is changed according to the number of SBs in the information processing system.

The configuration of the switch control unit 1931-$i$ in FIG. 23 is illustrative only, and some components may be omitted or changed according to the configuration or conditions of the information processing system. The configuration of the selection unit 2101-$i$ in FIG. 24 is illustrative only, and some components may be omitted or changed according to the configuration or conditions of the information processing system.

The flowcharts of FIGS. 17, 18, and 25 are illustrative only, and some processing may be omitted or changed according to the configuration or conditions of the information processing system. The sequences of FIGS. 19, 20, 26, and 27 are illustrative only, and some processing may be omitted or changed according to the configuration or conditions of the information processing system.

The control signal in FIGS. 9A and 9B is illustrative only, and another control signal may be used according to the specifications of the MMB 411, the BMC and the switch control unit.

The couplings among the ports in FIGS. 11 to 14 are illustrative only, and the couplings among the ports are changed depending on the numbers of the ports of the input-side HW information switch unit 432-$i$ and the output-side HW information switch unit 433-$i$. The couplings among the ports in FIGS. 15 and 16 are illustrative only, and the couplings among the ports are changed depending on the numbers of the ports of the input-side PCH switch unit 442-$i$ and the output-side PCH switch unit 443-$i$.

Figure 28:
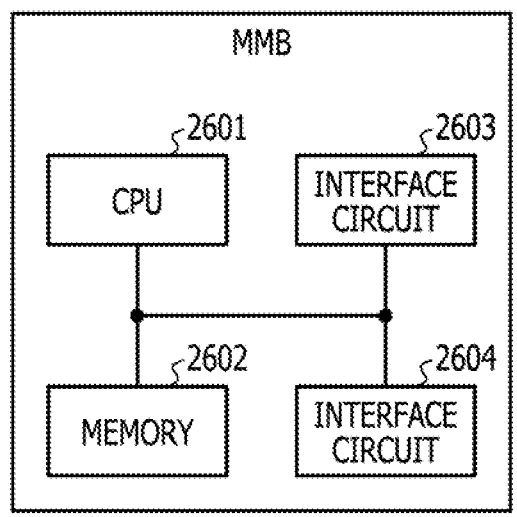
FIG. 28 is a diagram illustrating a hardware configuration of an MMB.

FIG. 28 illustrates an example of the hardware configuration of an information processing apparatus (computer) for use as the MMB 411 in FIG. 5. An MMB 411 in FIG. 28 includes a CPU 2601, a memory 2602, an interface circuit 2603, and an interface circuit 2604.

The memory 2602 is, for example, a semiconductor memory such as a read-only memory (ROM), a random-access memory (RAM), and a flash memory, and stores programs and data used for processing. The memory 2602 may store partition information 511 and takeover information 512 in FIG. 5.

The CPU 2601 (processor) operates as the notification unit 501, the HW information switch processing unit 502, the PCH switch processing unit 503, and the Home takeover processing unit 504 in FIG. 5, by executing a program by using the memory 2602, for example.

An operator or user may store the program and data in a portable recording medium (not illustrated) and may load the program or data in the memory 2602 for use. Examples of the portable recording medium include a memory device, a flexible disk, an optical disk, and a magnetooptical disk. The portable recording medium may be a compact disk read only memory (CD-ROM), a digital versatile disk (DVD), a USB memory or the like.

Thus, a computer-readable recording medium that stores a program and data for use in processing is a physical (non-transitory) recording medium like the memory 2602 or a portable recording medium.

The interface circuit 2603 is coupled to a communication network such as a private LAN and communicates with each BMC 412-$i$. The MMB 411 may receive a program and data from an external apparatus through the interface circuit 2603 and may load the program and data in the memory 2602 for use.

The interface circuit 2604 is coupled to a signal line such as GPIO, and communicates with the switch control unit 431-*i* and the switch control unit 441-*i* on each SB.

Further, the configuration of the MMB 411 in FIG. 28 is illustrative only, and some components may be omitted or changed according to the configuration or conditions of the information processing system 401.

Figure 29:
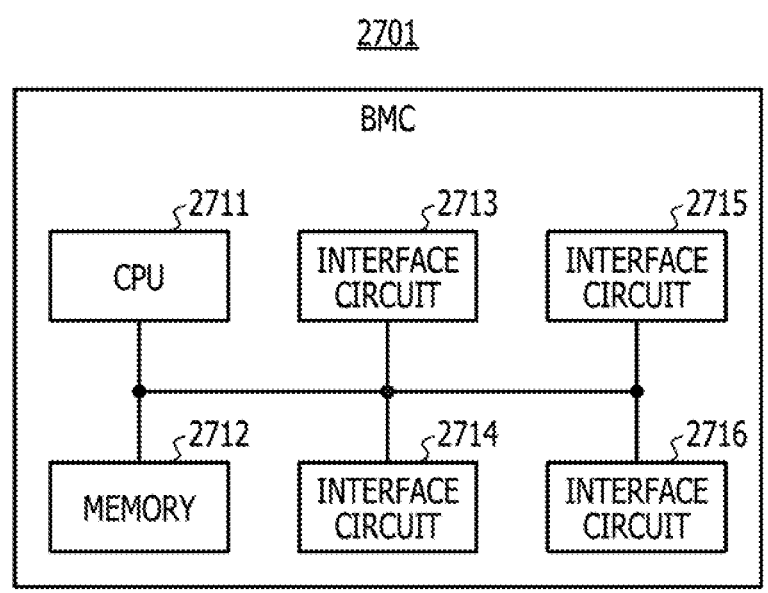
FIG. 29 is a diagram illustrating a hardware configuration of a BMC.

FIG. 29 illustrates an example of the hardware configuration of an information processing apparatus for use as the BMC 412-*i* in FIG. 6 and the BMC 1911-*i* in FIG. 22. The BMC 2701 in FIG. 29 corresponds to the BMC 412-*i* or BMC 1911-*i*, and includes a CPU 2711, a memory 2712, and interface circuits 2713 to 2716.

The memory 2712 is, for example, a semiconductor memory such as a ROM, a RAM, or a flash memory, and stores programs and data used in performing the processing. The memory 2712 may store the takeover information 611 in FIG. 6 or the takeover information 2011 in FIG. 22.

The CPU 2711 manages and monitors the hardware 414-*i* or the hardware 1913-*i* by executing a program using the memory 2712, for example. The CPU 2711 also operates as the HW information switch processing unit 601 and the information takeover processing unit 602 in FIG. 6 by executing the program. The CPU 2711 operates as the HW information switch processing unit 2001, the PCH switch processing unit 2002, the Home takeover processing unit 2003, and the information takeover processing unit 2004 in FIG. 22, by executing a program.

An operator or a user may store a program and data in a portable recording medium (not illustrated) and load the program and data into the memory 2712 for use. As described above, the computer-readable recording medium for storing the program and data used for the processing is a physical (non-transitory) recording medium such as the memory 2712 or the portable recording medium.

The interface circuit 2713 is coupled to a communication network such as a private LAN, and communicates with the MSB 411, the information storage unit 1951, or another BMC. The BMC 2701 may receive program and data from an external device through the interface circuit 2713, and may load the program and data into the memory 2712 for use.

The interface circuit 2714 is coupled to a signal line such as an LPC bus, and communicates with an OS or the like operating on the CPU. The interface circuit 2715 is coupled to the output-side HW information switch unit 433-*i* or 1933-*i* through a signal lines of the I2C or the like, to communicate with the hardware 414-*i* or hardware 1913-*i*. The interface circuit 2716 is coupled to a signal line such as GPIO, and communicates with the switch control unit 431-*i*, the switch control unit 1931-*i*, or the switch control unit 1941-*i*.

Further, the configuration of the BMC 2701 in FIG. 29 is illustrative only, and some components may be omitted or changed according to the configuration or conditions of the information processing system.

Although the disclosed embodiment and their advantages have been described in detail, those skilled in the art may make various modifications, additions and omissions without departing from the scope of the present disclosure which is clearly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a plurality of information processing apparatuses each of which includes:
      hardware,
      a control processor coupled to the hardware, and
      a switch circuit coupled to the hardware and the control processor;
   wherein when a failure of a first control processor in a first information processing apparatus of the plurality of information processing apparatuses is detected:
      a first switch circuit in the first information processing apparatus is configured to, in response to receiving a control signal, generate a connection of first hardware in the first information processing apparatus to a signal line between the first information processing apparatus and a second information processing apparatus of the plurality of information processing apparatuses,
      a second switch circuit in the second information processing apparatus is configured to generate a connection of a second control processor in the second information processing apparatus to the signal line, and
      the second control processor is configured to acquire information transmitted from the first hardware via the signal line; and
   a management apparatus coupled to the plurality of information processing apparatuses, wherein:
   the first control processor is configured to transmit information acquired from the first hardware to the management apparatus,
   the management apparatus is configured to:
      store the information received from the first control processor in a memory, and
      in response to detecting the failure of the first control processor, transmit the stored information and identification information of the first information processing apparatus to the second control processor, and transmit the control signal to the first switch circuit, and
   the second control processor is configured to cause the second switch circuit to generate the connection of the second control processor to the signal line in response to receiving the identification information of the first information processing apparatus.

2. The information processing system according to claim 1, wherein
   each switch circuit includes an input-side switch configured to switch a coupling between the hardware and another information processing apparatus of the plurality of information processing apparatuses, and an output-side switch configured to switch a coupling between the control processor and the other information processing apparatus,
   the connection of the first hardware to the signal line is generated by a first input-side switch in the first switch circuit in accordance with the control signal, and the connection of the second control processor to the signal line is generated by a second output-side switch in the second switch circuit in accordance with another control signal transmitted from the second control processor.

3. The information processing system according to claim 1, wherein:
each of the plurality of information processing apparatuses further includes:
a control circuit configured to manage communication between a processor included in the hardware and the control processor, and
a communication switch circuit configured to switch a coupling among another information processing apparatus of the plurality of information processing apparatuses, the control circuit, and the control processor; and
wherein when the failure of the first control processor is detected:
a first communication switch circuit in the first information processing apparatus is configured to, in response to receiving a first communication control signal received from the management apparatus, generate a connection of a first control circuit in the first information processing apparatus to a communication signal line between the first information processing apparatus and the second information processing apparatus,
a second communication switch circuit in the second information processing apparatus is configured to, in response to receiving a second communication control signal from the management apparatus, generate a connection of the second control processor to the communication signal line, and
the second control processor is configured to communicate with a first processor included in the first hardware in the first information processing apparatus via the first control circuit coupled to the communication signal line.

4. The information processing system according to claim 3, wherein
each communication switch circuit includes an input-side communication switch configured to switch a coupling between the control circuit and the other information processing apparatus, and an output-side communication switch configured to switch a coupling between the control processor and the other information processing apparatus,
the connection of the first control circuit to the communication signal line is generated by a first input-side communication switch in the first communication switch circuit in accordance with the first communication control signal, and
the connection of the second control processor to the communication signal line is generated by a second out-side communication switch circuit in the second communication switch circuit in accordance with the second communication control signal.

5. The information processing system according to claim 3, wherein
the first control processor is configured to transmit setting information of communication between the first processor and the first control processor to the management apparatus,
the management apparatus is configured to:
store the setting information received from the first control processor, and
in response to detecting the failure of the first control processor, transmit the stored setting information to the second control processor, transmit the first communication control signal to the first communication switch circuit, and transmit the second communication control signal to the second communication switch circuit, and
the second control processor is configured to communicate with the first processor in accordance with the setting information received from the management apparatus.

6. An information processing system comprising:
a plurality of information processing apparatuses each of which includes:
hardware,
a control processor coupled to the hardware, and
a switch circuit coupled to the hardware and the control processor;
wherein when a failure of a first control processor in a first information processing apparatus of the plurality of information processing apparatuses is detected:
a first switch circuit in the first information processing apparatus is configured to, in response to receiving a control signal, generate a connection of first hardware in the first information processing apparatus to a signal line between the first information processing apparatus and a second information processing apparatus of the plurality of information processing apparatuses,
a second switch circuit in the second information processing apparatus is configured to generate a connection of a second control processor in the second information processing apparatus to the signal line,
the second control processor is configured to acquire information transmitted from the first hardware via the signal line,
the first control processor is configured to transmit information acquired from the first hardware to the second control processor, and
the second control processor is configured to, in response to detecting the failure of the first control processor, transmit the control signal to the first switch circuit, and cause the second switch circuit to generate the connection of the second control processor to the signal line;
each of the plurality of information processing apparatuses further includes:
a control circuit configured to manage communication between a processor included in the hardware and the control processor, and
a communication switch circuit configured to switch a coupling among another information processing apparatus of the plurality of information processing apparatuses, the control circuit, and the control processor; and
when the failure of the first control processor is detected:
a first communication switch circuit in the first information processing apparatus is configured to, in response to receiving a first communication control signal received from the second control processor, generate a connection of a first control circuit in the first information processing apparatus to a communication signal line between the first information processing apparatus and the second information processing apparatus, a second communication switch circuit in the second information processing apparatus is configured to, in response to receiving a second communication control signal from the second control processor, generate a connection of the second control processor to the communication signal line, and the second control processor is configured to communicate with a first processor included in the first hardware in the first information processing apparatus via the first control circuit coupled to the communication signal line.

7. The information processing system according to claim 6, wherein each communication switch circuit includes an input-side communication switch configured to switch a coupling between the control circuit and the other information processing apparatus, and an output-side communication switch configured to switch a coupling between the control processor and the other information processing apparatus, the connection of the first control circuit to the communication signal line is generated by a first input-side communication switch in the first communication switch circuit in accordance with the first communication control signal, and the connection of the second control processor to the communication signal line is generated by a second out-side communication switch circuit in the second communication switch circuit in accordance with the second communication control signal.

8. The information processing system according to claim 6, wherein the first control processor is configured to transmit setting information of communication between the first processor and the first control processor to the second control processor, and the second control processor is configured to, in response to detecting the failure of the first control processor:
transmit the first communication control signal to the first communication switch circuit,
transmit the second communication control signal to the second communication switch circuit, and
communicate with the first processor in accordance with the setting information received from the first control processor.

9. An information processing system comprising:
a plurality of information processing apparatuses each of which includes:
hardware,
a control processor coupled to the hardware, and
a switch circuit coupled to the hardware and the control processor;
wherein when a failure of a first control processor in a first information processing apparatus of the plurality of information processing apparatuses is detected:
a first switch circuit in the first information processing apparatus is configured to, in response to receiving a control signal, generate a connection of first hardware in the first information processing apparatus to a signal line between the first information processing apparatus and a second information processing apparatus of the plurality of information processing apparatuses,
a second switch circuit in the second information processing apparatus is configured to generate a connection of a second control processor in the second information processing apparatus to the signal line, and the second control processor is configured to acquire information transmitted from the first hardware via the signal line; and a storage device coupled to the plurality of information processing apparatuses, wherein:

the first control processor is configured to transmit information acquired from the first hardware to the storage device, and the second control processor is configured to, in response to detecting the failure of the first control processor:
acquire the information from the storage device,
transmit the control signal to the first switch circuit, and
cause the second switch circuit to generate the connection of the second control processor to the signal line in response to changing identification information of the second information processing apparatus.

10. The information processing system according to claim 9, wherein:

each of the plurality of information processing apparatuses further includes:
a control circuit configured to manage communication between a processor included in the hardware and the control processor, and
a communication switch circuit configured to switch a coupling among another information processing apparatus of the plurality of information processing apparatuses, the control circuit, and the control processor; and when the failure of the first control processor is detected,
a first communication switch circuit in the first information processing apparatus is configured to, in response to receiving a first communication control signal received from the second control processor, generate a connection of a first control circuit in the first information processing apparatus to a communication signal line between the first information processing apparatus and the second information processing apparatus,
a second communication switch circuit in the second information processing apparatus is configured to, in response to receiving a second communication control signal from the second control processor, generate a connection of the second control processor to the communication signal line, and
the second control processor is configured to communicate with a first processor included in the first hardware in the first information processing apparatus via the first control circuit coupled to the communication signal line.

11. The information processing system according to claim 10, wherein each communication switch circuit includes an input-side communication switch configured to switch a coupling between the control circuit and the other information processing apparatus, and an output-side communication switch configured to switch a coupling between the control processor and the other information processing apparatus, the connection of the first control circuit to the communication signal line is generated by a first input-side communication switch in the first communication switch circuit in accordance with the first communication control signal, and the connection of the second control processor to the communication signal line is generated by a second out-side communication switch circuit in the second communication switch circuit in accordance with the second communication control signal.

12. The information processing system according to claim 10, wherein
the first control processor is configured to transmit setting information of communication between the first processor and the first control processor to the storage device, and
the second control processor is configured to, in response to detecting the failure of the first control processor:
acquire the setting information from the storage device,
transmit the first communication control signal to the first communication switch circuit,
transmit the second communication control signal to the second communication switch circuit, and
communicate with the first processor in accordance with the acquired setting information.

13. An information processing apparatus comprising:
hardware,
a control processor coupled to the hardware, and
a switch circuit coupled to the hardware and the control processor,
wherein when a failure of the control processor is detected:
the switch circuit is configured to, in response to receiving a control signal, generate a connection of the hardware to a signal line between the information processing apparatus and another information processing apparatus,
the hardware is configured to transmit information to another information processing apparatus via the signal line,
the control processor is configured to transmit information acquired from the hardware to a management apparatus which stores the information in a memory, and
the management apparatus transmits, in response to detecting the failure of the control processor, the stored information and identification information of the information processing apparatus to the another information processing apparatus, and the control signal to the switch circuit.

* * * * *